US012174759B2

(12) United States Patent
Hornung et al.

(10) Patent No.: US 12,174,759 B2
(45) Date of Patent: Dec. 24, 2024

(54) INTERPOLATION ACCELERATION IN A PROCESSOR MEMORY INTERFACE

(71) Applicant: Micron Technology, Inc., Boise, ID (US)

(72) Inventors: Bryan Hornung, Plano, TX (US); Tony M. Brewer, Plano, TX (US); Douglas Vanesko, Dallas, TX (US); Patrick Estep, Rowlett, TX (US)

(73) Assignee: Micron Technology, Inc., Boise, ID (US)

( * ) Notice: Subject to any disclaimer, the term of this patent is extended or adjusted under 35 U.S.C. 154(b) by 691 days.

(21) Appl. No.: 17/240,492

(22) Filed: Apr. 26, 2021

(65) Prior Publication Data

US 2022/0318162 A1    Oct. 6, 2022

Related U.S. Application Data

(60) Provisional application No. 63/168,085, filed on Mar. 30, 2021.

(51) Int. Cl.
| | |
|---|---|
| *G06F 13/16* | (2006.01) |
| *G01S 7/41* | (2006.01) |
| *G01S 13/90* | (2006.01) |
| *G01S 13/933* | (2020.01) |
| *G06F 9/30* | (2018.01) |
| *G06F 9/38* | (2018.01) |
| *G06N 20/00* | (2019.01) |

(52) U.S. Cl.
CPC .......... *G06F 13/1668* (2013.01); *G01S 7/41* (2013.01); *G01S 13/9021* (2019.05); *G01S 13/933* (2020.01); *G06F 9/3001* (2013.01); *G06F 9/3887* (2013.01); *G06N 20/00* (2019.01)

(58) Field of Classification Search
CPC .. G06F 13/1668; G06F 9/3001; G06F 9/3887; G06N 20/00; G01S 13/9021; G01S 13/933; G01S 7/41
See application file for complete search history.

(56) References Cited

U.S. PATENT DOCUMENTS

| | | | |
|---|---|---|---|
| 7,184,055 B2 | 2/2007 | Hamburg | |
| 2018/0189639 A1* | 7/2018 | Henry | ................ G06F 9/30043 |
| 2021/0064338 A1* | 3/2021 | Emmart | .................... G06F 7/57 |

OTHER PUBLICATIONS

Salomon, David, "Curves and Surfaces for Computer Graphics Chapter 2 Linear Interpolation", 978-0-387-28452-1, (Mar. 20, 2007), pp. 49-69.
Zeng, Min, "A New Linear Interpolation Algorithm", International Conference on Computer Engineering, Information Science and Application Technology ICCIA 2016, (Sep. 2016), 8 pages.

* cited by examiner

*Primary Examiner* — Andrew J Cromer
(74) *Attorney, Agent, or Firm* — Schwegman Lundberg & Woessner, P.A.

(57) ABSTRACT

Linear interpolation is performed within a memory system. The memory system receives a floating-point point index into an integer-indexed memory array. The memory system accesses the two values of the two adjacent integer indices, performs the linear interpolation, and provides the resulting interpolated value. In many system architectures, the critical limitation on system performance is the data transfer rate between memory and processing elements. Accordingly, reducing the amount of data transferred improves overall system performance and reduces power consumption.

33 Claims, 14 Drawing Sheets

INTERPOLATION ACCELERATION IN A PROCESSOR MEMORY INTERFACE

PRIORITY APPLICATION

This application claims the benefit of priority to U.S. Provisional Application Ser. No. 63/168,085, filed Mar. 30, 2021, which is incorporated herein by reference in its entirety.

STATEMENT REGARDING GOVERNMENT SUPPORT

This invention was made with Government support under Agreement No. HR0011-19-3-0002, awarded by DARPA. The Government has certain rights in the invention.

TECHNICAL FIELD

Embodiments of the disclosure relate generally to processor memory interfaces and more specifically to interpolation acceleration in a processor memory interface.

BACKGROUND

Various computer architectures, such as the Von Neumann architecture, conventionally use a shared memory for data, a bus for accessing the shared memory, an arithmetic unit, and a program control unit. However, moving data between processors and memory can require significant time and energy, which in turn can constrain performance and capacity of computer systems. In view of these limitations, new computing architectures and devices are desired to advance computing performance beyond the practice of transistor scaling (i.e., Moore's Law).

BRIEF DESCRIPTION OF THE SEVERAL VIEWS OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

To easily identify the discussion of any particular element or act, the most significant digit or digits in a reference number refer to the figure number in which that element is first introduced.

DETAILED DESCRIPTION

Figure 1:
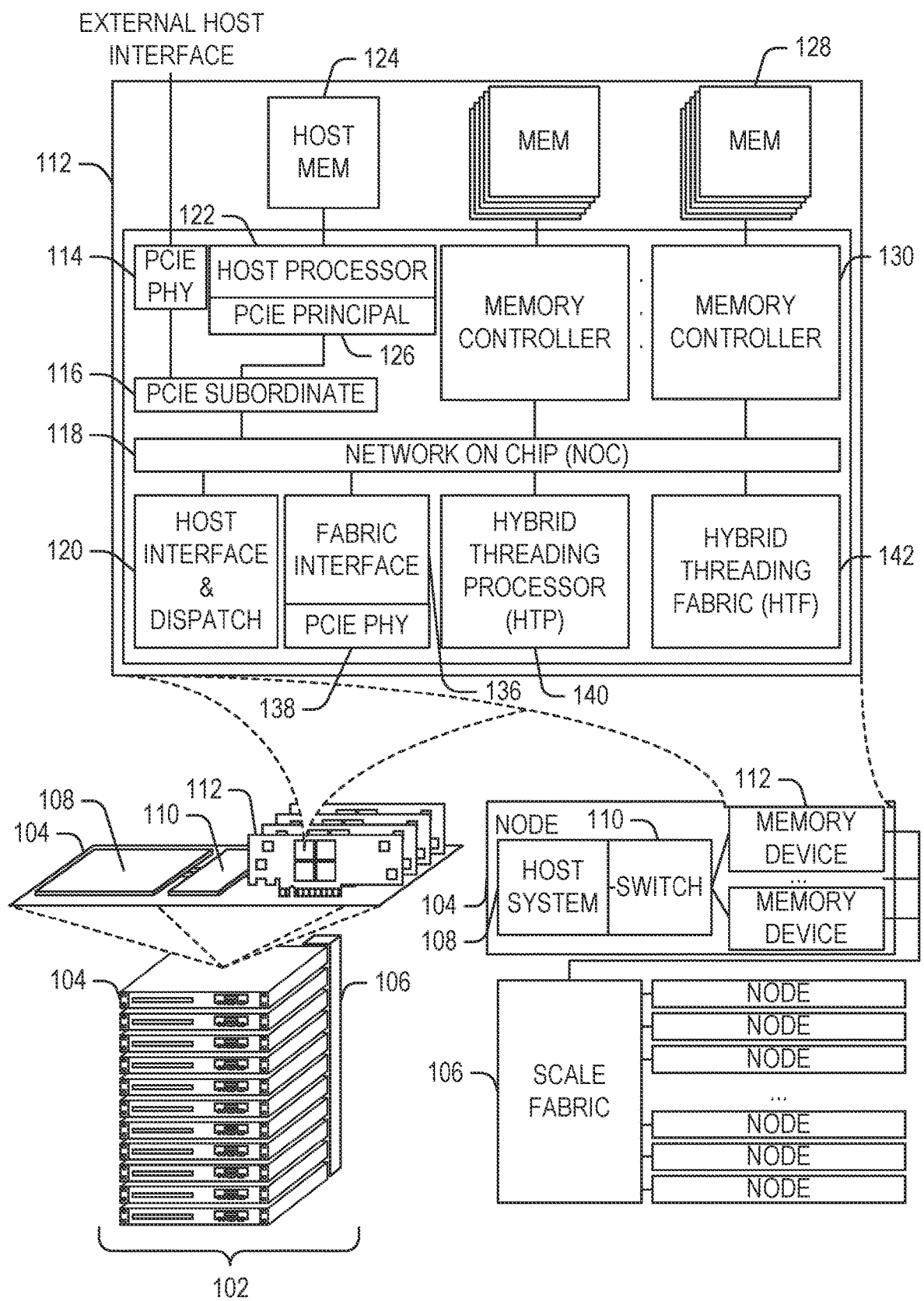
FIG. 1 illustrates generally a first example of a first memory-compute device in the context of a memory-compute system, according to an embodiment.

Recent advances in materials, devices, and integration technology can be leveraged to provide memory-centric compute topologies. Such topologies can realize advances in compute efficiency and workload throughput, for example, for applications constrained by size, weight, or power requirements. The topologies can be used to facilitate low-latency compute near, or inside of, memory or other data storage elements. The approaches can be particularly well-suited for various compute-intensive operations with sparse lookups, such as in transform computations (e.g., fast Fourier transform computations (FFT)), or in applications such as neural networks or artificial intelligence (AI), financial analytics, or simulations or modeling such as for computational fluid dynamics (CFD), Enhanced Acoustic Simulator for Engineers (EASE), Simulation Program with Integrated Circuit Emphasis (SPICE), and others.

Systems, devices, and methods discussed herein can include or use memory-compute systems with processors, or processing capabilities, that are provided in, near, or integrated with memory or data storage components. Such systems are referred to generally herein as compute-near-memory (CNM) systems. A CNM system can be a node-based system with individual nodes in the systems coupled using a system scale fabric. Each node can include or use specialized or general purpose processors and user-accessible accelerators with a custom compute fabric to facilitate intensive operations, particularly in environments where high cache miss rates are expected.

In an example, each node in a CNM system can have a host processor or processors. Within each node, a dedicated hybrid threading processor can occupy a discrete endpoint of an on-chip network. The hybrid threading processor can have access to some or all of the memory in a particular node of the system, or a hybrid threading processor can have access to memories across a network of multiple nodes via the system scale fabric. The custom compute fabric, or hybrid threading fabric, at each node can have its own processor(s) or accelerator(s) and can operate at higher bandwidth than the hybrid threading processor. Different nodes in a CNM system can be differently configured, such as having different compute capabilities, different types of memories, different interfaces, or other differences. However, the nodes can be commonly coupled to share data and compute resources within a defined address space.

In an example, a CNM system, or a node within the system, can be user-configured for custom operations. A user can provide instructions using a high-level programming language, such as C/C++, that can be compiled and mapped directly into a dataflow architecture of the system, or of one or more nodes in the CNM system. That is, the nodes in the system can include hardware blocks (e.g., memory controllers, atomic units, other customer accelerators, etc.) that can be configured to directly implement or support user instructions to thereby enhance system performance and reduce latency.

In an example, a CNM system can be particularly suited for implementing a hierarchy of instructions and nested loops (e.g., two, three, or more loops deep, or multiple-dimensional loops). A standard compiler can be used to accept high-level language instructions and, in turn, compile directly into the dataflow architecture of one or more of the nodes. For example, a node in the system can include a hybrid threading fabric accelerator. The hybrid threading fabric accelerator can execute in a user space of the CNM system and can initiate its own threads or sub-threads, which can operate in parallel. Each thread can map to a different loop iteration to thereby support multi-dimensional loops. With the capability to initiate such nested loops, among other capabilities, the CNM system can realize significant time savings and latency improvements for compute-intensive operations.

Figure 6A:
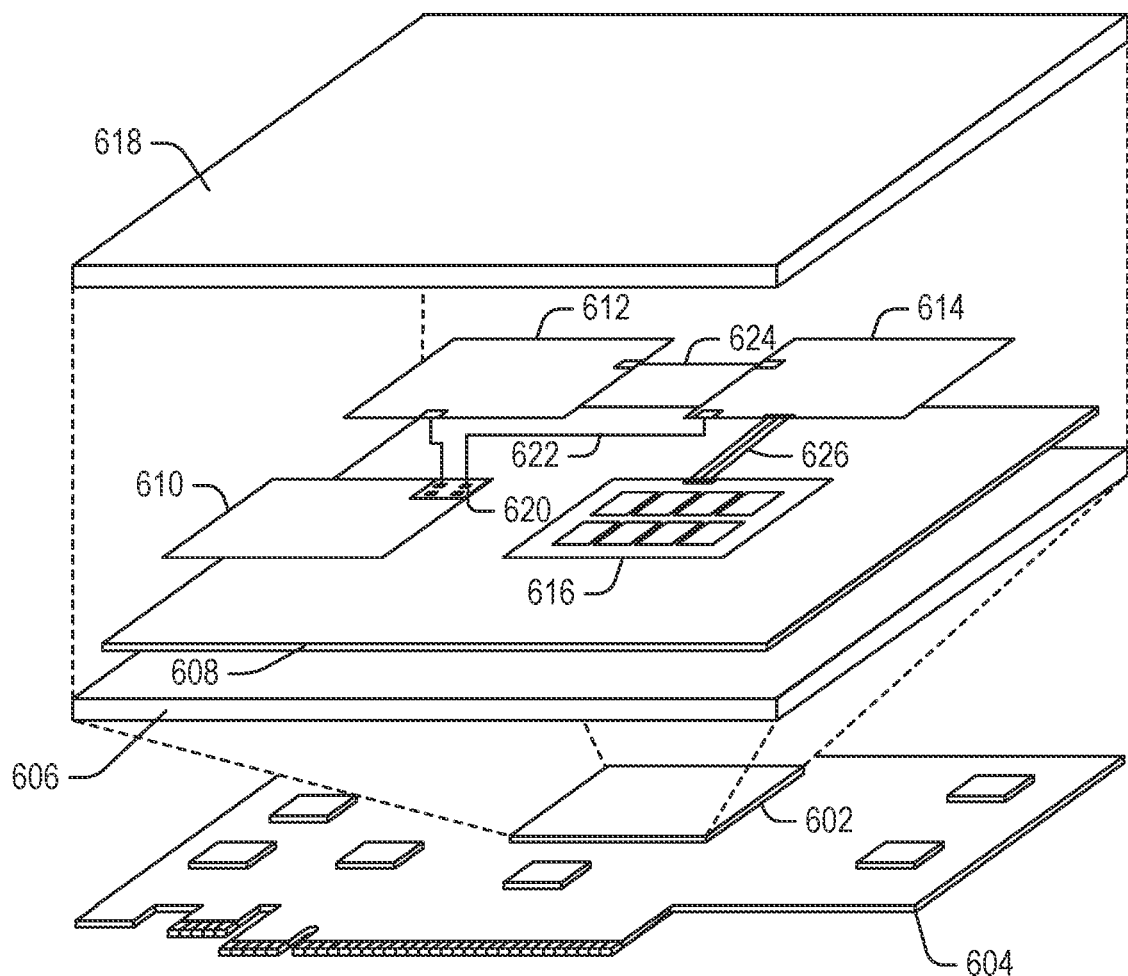
FIG. 6A illustrates generally an example of a chiplet system, according to an embodiment.
Figure 6B:
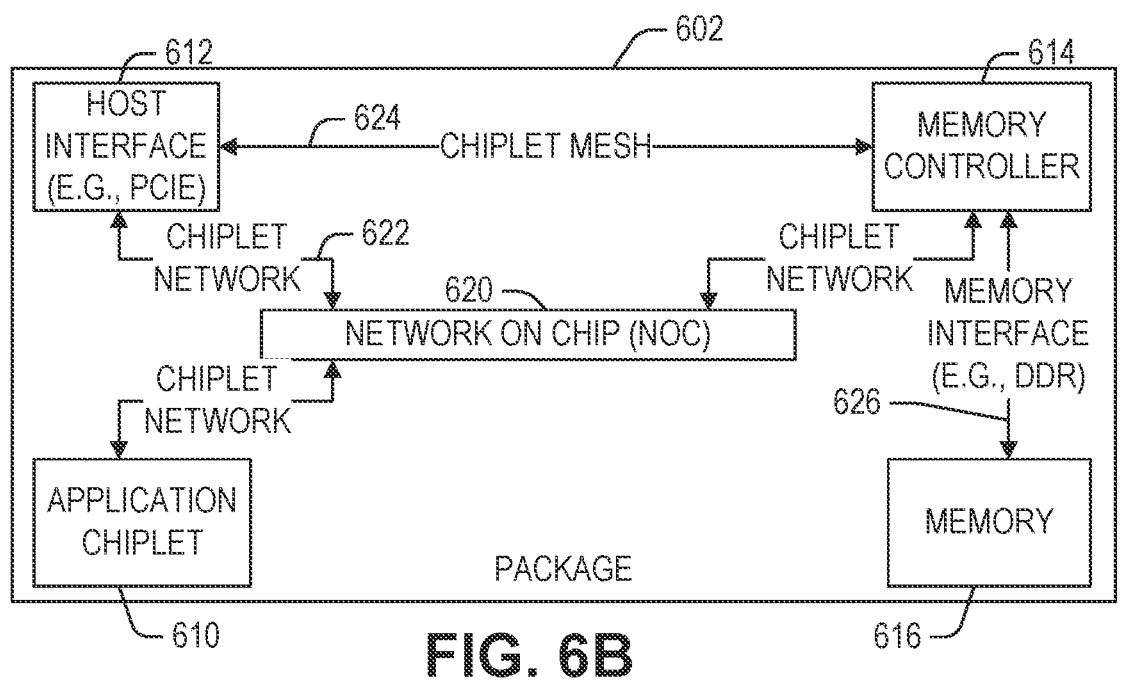
FIG. 6B illustrates generally a block diagram showing various components in the chiplet system from the example of FIG. 6A.

A CNM system, or nodes or components of a CNM system, can include or use various memory devices, controllers, and interconnects, among other things. In an example, the system can comprise various interconnected nodes and the nodes, or groups of nodes, can be implemented using chiplets. Chiplets are an emerging technique for integrating various processing functionality. Generally, a chiplet system is made up of discrete chips (e.g., integrated circuits (ICs) on different substrate or die) that are integrated on an interposer and packaged together. This arrangement is distinct from single chips (e.g., ICs) that contain distinct device blocks (e.g., intellectual property (IP) blocks) on one substrate (e.g., single die), such as a system-on-a-chip (SoC), or discretely packaged devices integrated on a board. In general, chiplets provide more production benefits than single die chips, including higher yields or reduced development costs. FIG. 6A and FIG. 6B, discussed below, illustrate generally an example of a chiplet system such as can comprise a CNM system.

Linear interpolation constructs new datapoints within the range of a discrete set of known data points. For example, a value may be measured at regular units of time (e.g., every second, every 0.01 seconds, or the like) and a continuous function for the value may be estimated by using linear interpolation for the time values between the measurements. To perform the linear interpolation, the two adjacent measured values to the intermediate point to be estimated are retrieved. The two adjacent measured values are combined using a weighted average to generate an interpolated value for the intermediate point.

One use for linear interpolation is in processing data generated by synthetic-aperture radar (SAR). The radar antenna emits radar pulses and receives their reflections. SAR is typically used on a moving platform, such as an aircraft, drone, or spacecraft. Since the position of the antenna changes between the time of emitting a radar pulse and receiving the reflection of the pulse, the synthetic-aperture of the radar is increased, giving greater accuracy for a same (physical) sized radar over conventional beam-scanning radar. The wavelength of the SAR may be in the range of 1-1000 mm.

The pulse data is processed, using a backprojection algorithm, to generate a two-dimensional image, with the value of each pixel of the image indicating a distance of the corresponding scanned point from the SAR. Thus, a flying device can use SAR to generate a topographical image of the area being flown over. This image can be used for navigation. For example, landmarks may be identified in the image and compared to landmarks of a preplanned route. As another example, image recognition may identify targets to be attacked, followed, or avoided.

The discrete pulse data gathered by the SAR may be expanded using a Fourier transform (e.g., FFT) to generate intermediate values. The gathered data, the generated data, or both may be used for linear interpolation, providing an approximate pulse value for any index within the range of pulses. For example, if 1000 pulses were sent and data obtained for each of the 1000 pulses, the FFT may be used to expand the data by a factor of 10, such that indices of 0.0-999.0 become valid in 0.1-unit increments. Using linear interpolation, any floating-point index within the 0.0-999.0 range gives a valid value.

When linear interpolation is performed on a processor using data stored on a memory device, the processor determines which measured values to retrieve, retrieves both of them, and performs the interpolation computation. By contrast, when a measured value is retrieved, the processor retrieves only the single measured value. Thus, the data transferred from the memory to the processor used for an interpolated value is twice the data transferred for a measured value.

As discussed herein, linear interpolation is performed within the memory system. The processor provides a floating-point point index into an integer-indexed memory array. The memory system accesses the two values of the two adjacent integer indices, performs the linear interpolation, and provides the resulting interpolated value to the processor. Thus, according to some example embodiments, the data transferred from the memory to the processor used for an interpolated value is the same as the data transferred for a measured value.

In many system architectures, the critical limitation on system performance is the data transfer rate between memory and the processors. Accordingly, reducing the amount of data transferred improves overall system performance. Additionally, the power consumed by transferring data from the memory system to the processor is not insubstantial, particularly in battery-powered devices such as drones, autonomous electric vehicles, smart phones, tablets, and laptops. Thus, battery life may be extended by using the systems and methods described herein.

FIG. 1 illustrates generally a first example of a CNM system 102. The example of the CNM system 102 includes multiple different memory-compute nodes, such as can each include various CNM devices. Each node in the system can operate in its own operating system (OS) domain (e.g., Linux, among others). In an example, the nodes can exist collectively in a common OS domain of the CNM system 102.

The example of FIG. 1 includes an example of a first memory-compute node 104 of the CNM system 102. The CNM system 102 can have multiple nodes, such as including different instances of the first memory-compute node 104, that are coupled using a scale fabric 106. In an example, the architecture of the CNM system 102 can support scaling with up to n different memory-compute nodes (e.g., n=4096) using the scale fabric 106. As further discussed below, each node in the CNM system 102 can be an assembly of multiple devices.

The CNM system 102 can include a global controller for the various nodes in the system, or a particular memory-compute node in the system can optionally serve as a host or controller to one or multiple other memory-compute nodes in the same system. The various nodes in the CNM system 102 can thus be similarly or differently configured.

In an example, each node in the CNM system 102 can comprise a host system that uses a specified operating system. The operating system can be common or different among the various nodes in the CNM system 102. In the example of FIG. 1, the first memory-compute node 104 comprises a host system 108, a first switch 110, and a first memory-compute device 112. The host system 108 can comprise a processor, such as can include an X86, ARM, RISC-V, or other type of processor. The first switch 110 can be configured to facilitate communication between or among devices of the first memory-compute node 104 or of the CNM system 102, such as using a specialized or other communication protocol, generally referred to herein as a chip-to-chip protocol interface (CTCPI). That is, the CTCPI can include a specialized interface that is unique to the CNM system 102, or can include or use other interfaces such as the compute express link (CXL) interface, the peripheral component interconnect express (PCIe) interface, or the chiplet protocol interface (CPI), among others. The first switch 110 can include a switch configured to use the CTCPI. For example, the first switch 110 can include a CXL switch, a PCIe switch, a CPI switch, or other type of switch. In an example, the first switch 110 can be configured to couple differently configured endpoints. For example, the first switch 110 can be configured to convert packet formats, such as between PCIe and CPI formats, among others.

The CNM system 102 is described herein in various example configurations, such as comprising a system of nodes, and each node can comprise various chips (e.g., a processor, a switch, a memory device, etc.). In an example, the first memory-compute node 104 in the CNM system 102 can include various chips implemented using chiplets. In the below-discussed chiplet-based configuration of the CNM system 102, inter-chiplet communications, as well as additional communications within the system, can use a CPI network. The CPI network described herein is an example of the CTCPI, that is, as a chiplet-specific implementation of the CTCPI. As a result, the below-described structure, operations, and functionality of CPI can apply equally to structures, operations, and functions as may be otherwise implemented using non-chiplet-based CTCPI implementations. Unless expressly indicated otherwise, any discussion herein of CPI applies equally to CTCPI.

A CPI interface includes a packet-based network that supports virtual channels to enable a flexible and high-speed interaction between chiplets, such as can comprise portions of the first memory-compute node 104 or the CNM system 102. The CPI can enable bridging from intra-chiplet networks to a broader chiplet network. For example, the Advanced eXtensible Interface (AXI) is a specification for intra-chip communications. AXI specifications, however, cover a variety of physical design options, such as the number of physical channels, signal timing, power, and so forth. Within a single chip, these options are generally selected to meet design goals, such as power consumption, speed, and so forth. However, to achieve the flexibility of a chiplet-based memory-compute system, an adapter, such as using CPI, can interface between the various AXI design options that can be implemented in the various chiplets. By enabling a physical channel-to-virtual channel mapping and encapsulating time-based signaling with a packetized protocol, CPI can be used to bridge intra-chiplet networks, such as within a particular memory-compute node, across a broader chiplet network, such as across the first memory-compute node 104, or across the CNM system 102.

The CNM system 102 is scalable to include multiple-node configurations. That is, multiple different instances of the first memory-compute node 104, or of other differently configured memory-compute nodes, can be coupled using the scale fabric 106, to provide a scaled system. Each of the memory-compute nodes can run its own operating system and can be configured to jointly coordinate system-wide resource usage.

In the example of FIG. 1, the first switch 110 of the first memory-compute node 104 is coupled to the scale fabric 106. The scale fabric 106 can provide a switch (e.g., a CTCPI switch, a PCIe switch, a CPI switch, or other switch) that can facilitate communication among and between different memory-compute nodes. In an example, the scale fabric 106 can help various nodes communicate in a partitioned global address space (PGAS).

In an example, the first switch 110 from the first memory-compute node 104 is coupled to one or multiple different memory-compute devices, such as including the first memory-compute device 112. The first memory-compute device 112 can comprise a chiplet-based architecture referred to herein as a CNM chiplet. A packaged version of the first memory-compute device 112 can include, for example, one or multiple CNM chiplets. The chiplets can be communicatively coupled using CTCPI for high bandwidth and low latency.

In the example of FIG. 1, the first memory-compute device 112 can include a network on chip (NOC) or first NOC 118. Generally, a NOC is an interconnection network within a device, connecting a particular set of endpoints. In FIG. 1, the first NOC 118 can provide communications and connectivity between the various memory, compute resources, and ports of the first memory-compute device 112.

In an example, the first NOC 118 can comprise a folded Clos topology, such as within each instance of a memory-compute device, or as a mesh that couples multiple memory-compute devices in a node. The Clos topology, such as can use multiple, smaller radix crossbars to provide functionality associated with a higher radix crossbar topology, offers various benefits. For example, the Clos topology can exhibit consistent latency and bisection bandwidth across the NOC.

The first NOC 118 can include various distinct switch types including hub switches, edge switches, and endpoint switches. Each of the switches can be constructed as crossbars that provide substantially uniform latency and bandwidth between input and output nodes. In an example, the endpoint switches and the edge switches can include two separate crossbars, one for traffic headed to the hub switches, and the other for traffic headed away from the hub switches.

The hub switches can be constructed as a single crossbar that switches all inputs to all outputs.

In an example, the hub switches can have multiple ports each (e.g., four or six ports each), such as depending on whether the particular hub switch participates in inter-chip communications. A number of hub switches that participate in inter-chip communications can be set by an inter-chip bandwidth requirement.

The first NOC 118 can support various payloads (e.g., from 8 to 64-byte payloads; other payload sizes can similarly be used) between compute elements and memory. In an example, the first NOC 118 can be optimized for relatively smaller payloads (e.g., 8-16 bytes) to efficiently handle access to sparse data structures.

In an example, the first NOC 118 can be coupled to an external host via a first physical-layer interface 114, a PCIe subordinate module 116 or endpoint, and a PCIe principal module 126 or root port. That is, the first physical-layer interface 114 can include an interface to allow an external host processor to be coupled to the first memory-compute device 112. An external host processor can optionally be coupled to one or multiple different memory-compute devices, such as using a PCIe switch or other, native protocol switch. Communication with the external host processor through a PCIe-based switch can limit device-to-device communication to that supported by the switch. Communication through a memory-compute device-native protocol switch such as using CTCPI, in contrast, can allow for more full communication between or among different memory-compute devices, including support for a partitioned global address space, such as for creating threads of work and sending events.

In an example, the CTCPI protocol can be used by the first NOC 118 in the first memory-compute device 112, and the first switch 110 can include a CTCPI switch. The CTCPI switch can allow CTCPI packets to be transferred from a source memory-compute device, such as the first memory-compute device 112, to a different, destination memory-compute device (e.g., on the same or other node), such as without being converted to another packet format.

In an example, the first memory-compute device 112 can include an internal host processor 122. The internal host processor 122 can be configured to communicate with the first NOC 118 or other components or modules of the first memory-compute device 112, for example, using the internal PCIe principal module 126, which can help eliminate a physical layer that would consume time and energy. In an example, the internal host processor 122 can be based on a RISC-V ISA processor, and can use the first physical-layer interface 114 to communicate outside of the first memory-compute device 112, such as to other storage, networking, or other peripherals to the first memory-compute device 112. The internal host processor 122 can control the first memory-compute device 112 and can act as a proxy for operating system-related functionality. The internal host processor 122 can include a relatively small number of processing cores (e.g., 2-4 cores) and a host memory device 124 (e.g., comprising a dynamic random access memory (DRAM) module).

In an example, the internal host processor 122 can include PCI root ports. When the internal host processor 122 is in use, then one of its root ports can be connected to the PCIe subordinate module 116. Another of the root ports of the internal host processor 122 can be connected to the first physical-layer interface 114, such as to provide communication with external PCI peripherals. When the internal host processor 122 is disabled, then the PCIe subordinate module 116 can be coupled to the first physical-layer interface 114 to allow an external host processor to communicate with the first NOC 118. In an example of a system with multiple memory-compute devices, the first memory-compute device 112 can be configured to act as a system host or controller. In this example, the internal host processor 122 can be in use, and other instances of internal host processors in the respective other memory-compute devices can be disabled.

The internal host processor 122 can be configured at power-up of the first memory-compute device 112, such as to allow the host to initialize. In an example, the internal host processor 122 and its associated data paths (e.g., including the first physical-layer interface 114, the PCIe subordinate module 116, etc.) can be configured from input pins to the first memory-compute device 112. One or more of the pins can be used to enable or disable the internal host processor 122 and configure the PCI (or other) data paths accordingly.

In an example, the first NOC 118 can be coupled to the scale fabric 106 via a scale fabric interface module 136 and a second physical-layer interface 138. The scale fabric interface module 136, or SIF, can facilitate communication between the first memory-compute device 112 and a device space, such as a partitioned global address space (PGAS). The PGAS can be configured such that a particular memory-compute device, such as the first memory-compute device 112, can access memory or other resources on a different memory-compute device (e.g., on the same or different node), such as using a load/store paradigm. Various scalable fabric technologies can be used, including CTCPI, CPI, Gen-Z, PCI, or Ethernet bridged over CXL. The scale fabric 106 can be configured to support various packet formats. In an example, the scale fabric 106 supports orderless packet communications, or supports ordered packets such as can use a path identifier to spread bandwidth across multiple equivalent paths. The scale fabric 106 can generally support remote operations such as remote memory read, write, and other built-in atomics, remote memory atomics, remote memory-compute device send events, and remote memory-compute device call and return operations.

In an example, the first NOC 118 can be coupled to one or multiple different memory modules, such as including a first memory device 128. The first memory device 128 can include various kinds of memory devices, for example, low-power double data rate 5 (LPDDR5) SDRAM or graphics double data rate 6 (GDDR6) DRAM, among others. In the example of FIG. 1, the first NOC 118 can coordinate communications with the first memory device 128 via a memory controller 130 that can be dedicated to the particular memory module. In an example, the memory controller 130 can include a memory module cache and an atomic operations module. The atomic operations module can be configured to provide relatively high-throughput atomic operators, such as including integer and floating-point operators. The atomic operations module can be configured to apply its operators to data within the memory module cache (e.g., comprising static random-access memory (SRAM) memory side cache), thereby allowing back-to-back atomic operations using the same memory location, with minimal throughput degradation.

The memory module cache can provide storage for frequently accessed memory locations, such as without having to re-access the first memory device 128. In an example, the memory module cache can be configured to cache data only for a particular instance of the memory controller 130. In an example, the memory controller 130 includes a DRAM controller configured to interface with the first memory device 128, such as including DRAM devices. The memory controller 130 can provide access scheduling and bit error management, among other functions.

In an example, the first NOC 118 can be coupled to a hybrid threading processor (HTP 140), a hybrid threading fabric (HTF 142), and a host interface and dispatch module (HIF 120). The HIF 120 can be configured to facilitate access to host-based command request queues and response queues. In an example, the HIF 120 can dispatch new threads of execution on processor or compute elements of the HTP 140 or the HTF 142. In an example, the HIF 120 can be configured to maintain workload balance across the HTP 140 module and the HTF 142 module.

The hybrid threading processor, or HTP 140, can include an accelerator, such as can be based on a RISC-V instruction set. The HTP 140 can include a highly threaded, event-driven processor in which threads can be executed in single instruction rotation, such as to maintain high instruction throughput. The HTP 140 comprises relatively few custom instructions to support low-overhead threading capabilities, event send/receive, and shared memory atomic operators.

The hybrid threading fabric, or HTF 142, can include an accelerator, such as can include a non-von Neumann, coarse-grained, reconfigurable processor. The HTF 142 can be optimized for high-level language operations and data types (e.g., integer or floating point). In an example, the HTF 142 can support data flow computing. The HTF 142 can be configured to use substantially all of the memory bandwidth available on the first memory-compute device 112, such as when executing memory-bound compute kernels.

The HTP and HTF accelerators of the CNM system 102 can be programmed using various high-level, structured programming languages. For example, the HTP and HTF accelerators can be programmed using C/C++, such as using the LLVM compiler framework. The HTP accelerator can leverage an open source compiler environment, such as with various added custom instruction sets configured to improve memory access efficiency, provide a message passing mechanism, and manage events, among other things. In an example, the HTF accelerator can be designed to enable programming of the HTF 142 using a high-level programming language, and the compiler can generate a simulator configuration file or a binary file that runs on the HTF 142 hardware. The HTF 142 can provide a mid-level language for expressing algorithms precisely and concisely, while hiding configuration details of the HTF accelerator itself. In an example, the HTF accelerator tool chain can use an LLVM front-end compiler and the LLVM intermediate representation (IR) to interface with an HTF accelerator back end.

Figure 2:
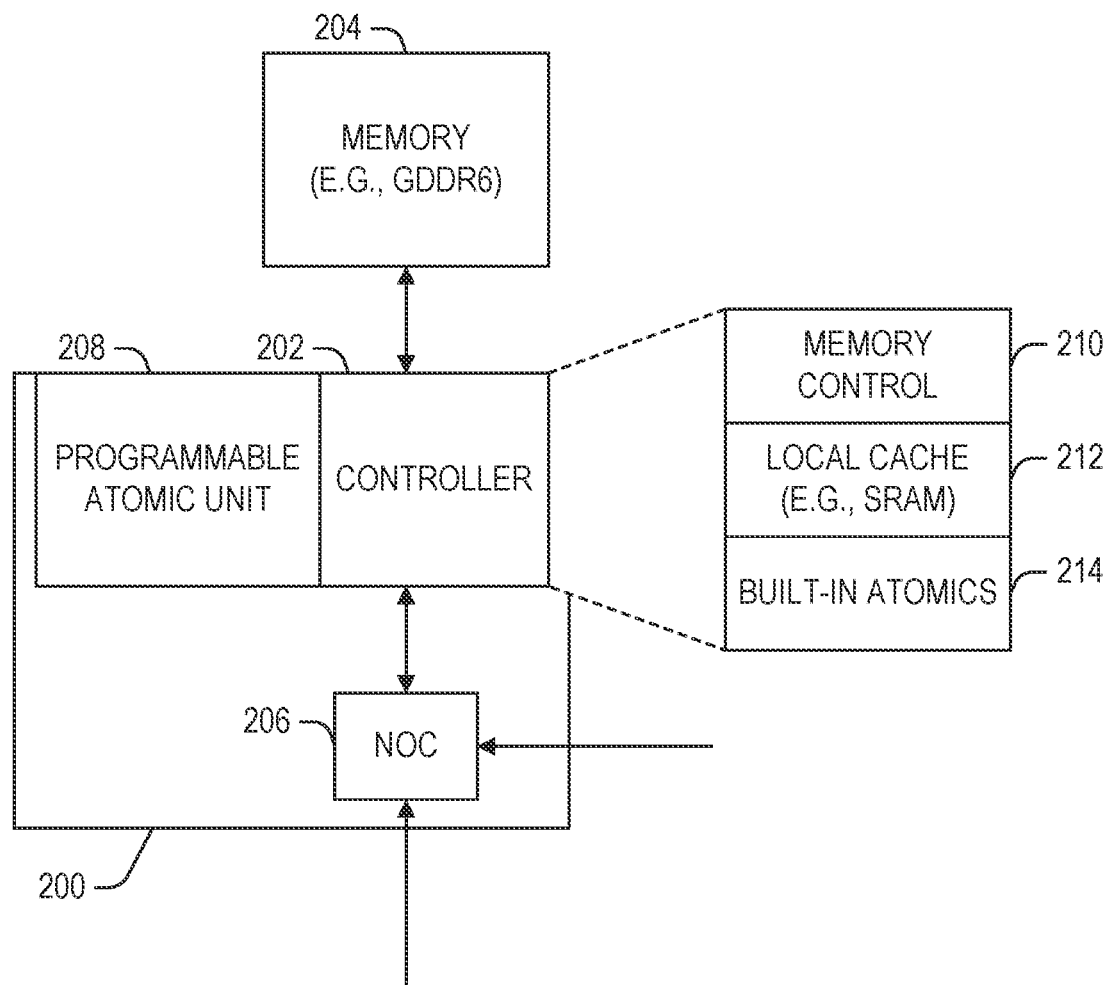
FIG. 2 illustrates generally an example of a memory subsystem of a memory-compute device, according to an embodiment.

FIG. 2 illustrates generally an example of a memory subsystem 200 of a memory-compute device, according to an embodiment. The example of the memory subsystem 200 includes a controller 202, a programmable atomic unit 208, and a second NOC 206. The controller 202 can include or use the programmable atomic unit 208 to carry out operations using information in a memory device 204. In an example, the memory subsystem 200 comprises a portion of the first memory-compute device 112 from the example of FIG. 1, such as including portions of the first NOC 118 or of the memory controller 130.

In the example of FIG. 2, the second NOC 206 is coupled to the controller 202 and the controller 202 can include a memory control module 210, a local cache module 212, and a built-in atomics module 214. In an example, the built-in atomics module 214 can be configured to handle relatively simple, single-cycle, integer atomics. The built-in atomics module 214 can perform atomics at the same throughput as, for example, normal memory read or write operations. In an example, an atomic memory operation can include a combination of storing data to the memory, performing an atomic memory operation, and then responding with load data from the memory.

The local cache module 212, such as can include an SRAM cache, can be provided to help reduce latency for repetitively-accessed memory locations. In an example, the local cache module 212 can provide a read buffer for sub-memory line accesses. The local cache module 212 can be particularly beneficial for compute elements that have relatively small or no data caches. In some example embodiments, the local cache module 212 is a 2 kilobyte read-only cache.

The memory control module 210, such as can include a DRAM controller, can provide low-level request buffering and scheduling, such as to provide efficient access to the memory device 204, such as can include a DRAM device. In an example, the memory device 204 can include or use a GDDR6 DRAM device, such as having 16 Gb density and 64 Gb/sec peak bandwidth. Other devices can similarly be used.

In an example, the programmable atomic unit 208 can comprise single-cycle or multiple-cycle operator such as can be configured to perform integer addition or more complicated multiple-instruction operations such as bloom filter insert. In an example, the programmable atomic unit 208 can be configured to perform load and store-to-memory operations. The programmable atomic unit 208 can be configured to leverage the RISC-V ISA with a set of specialized instructions to facilitate interactions with the controller 202 to atomically perform user-defined operations.

Programmable atomic requests, such as received from an on-node or off-node host, can be routed to the programmable atomic unit 208 via the second NOC 206 and the controller 202. In an example, custom atomic operations (e.g., carried out by the programmable atomic unit 208) can be identical to built-in atomic operations (e.g., carried out by the built-in atomics module 214) except that a programmable atomic operation can be defined or programmed by the user rather than the system architect. In an example, programmable atomic request packets can be sent through the second NOC 206 to the controller 202, and the controller 202 can identify the request as a custom atomic. The controller 202 can then forward the identified request to the programmable atomic unit 208.

Figure 3:
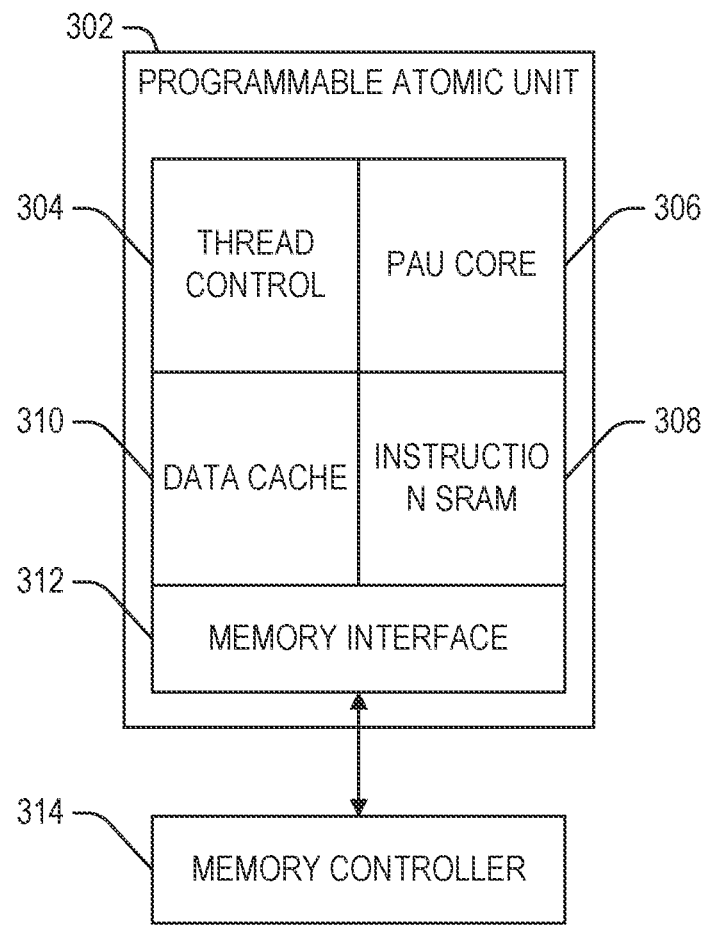
FIG. 3 illustrates generally an example of a programmable atomic unit for a memory controller, according to an embodiment.

FIG. 3 illustrates generally an example of a programmable atomic unit 302 for use with a memory controller, according to an embodiment. In an example, the programmable atomic unit 302 can comprise or correspond to the programmable atomic unit 208 from the example of FIG. 2. That is, FIG. 3 illustrates components in an example of a programmable atomic unit 302 (PAU), such as those noted above with respect to FIG. 2 (e.g., in the programmable atomic unit 208), or to FIG. 1 (e.g., in an atomic operations module of the memory controller 130). As illustrated in FIG. 3, the programmable atomic unit 302 includes a PAU processor or PAU core 306, a PAU thread control 304, an instruction SRAM 308, a data cache 310, and a memory interface 312 to interface with a memory controller 314. In an example, the memory controller 314 comprises an example of the controller 202 from the example of FIG. 2.

In an example, the PAU core 306 is a pipelined processor such that multiple stages of different instructions are executed together per clock cycle. The PAU core 306 can include a barrel-multithreaded processor, with thread control 304 circuitry to switch between different register files (e.g., sets of registers containing current processing state) upon each clock cycle. This enables efficient context switching between currently executing threads. In an example, the PAU core 306 supports eight threads, resulting in eight register files. In an example, some or all of the register files are not integrated into the PAU core 306, but rather reside in a local data cache 310 or the instruction SRAM 308. This reduces circuit complexity in the PAU core 306 by eliminating the traditional flip-flops used for registers in such memories.

The local PAU memory can include instruction SRAM 308, such as can include instructions for various atomics. The instructions comprise sets of instructions to support various application-loaded atomic operators. When an atomic operator is requested, such as by an application chiplet, a set of instructions corresponding to the atomic operator are executed by the PAU core 306. In an example, the instruction SRAM 308 can be partitioned to establish the sets of instructions. In this example, the specific programmable atomic operator being requested by a requesting process can identify the programmable atomic operator by the partition number. The partition number can be established when the programmable atomic operator is registered with (e.g., loaded onto) the programmable atomic unit 302. Other metadata for the programmable instructions can be stored in memory (e.g., in partition tables) local to the programmable atomic unit 302.

In an example, atomic operators manipulate the data cache 310, which is generally synchronized (e.g., flushed) when a thread for an atomic operator completes. Thus, aside from initial loading from the external memory, such as from the memory controller 314, latency can be reduced for most memory operations during execution of a programmable atomic operator thread.

A pipelined processor, such as the PAU core 306, can experience an issue when an executing thread attempts to issue a memory request if an underlying hazard condition would prevent such a request. Here, the memory request is to retrieve data from the memory controller 314, whether it be from a cache on the memory controller 314 or off-die memory. To resolve this issue, the PAU core 306 is configured to deny the memory request for a thread. Generally, the PAU core 306 or the thread control 304 can include circuitry to enable one or more thread rescheduling points in the pipeline. Here, the denial occurs at a point in the pipeline that is beyond (e.g., after) these thread rescheduling points. In an example, the hazard occurred beyond the rescheduling point. Here, a preceding instruction in the thread created the hazard after the memory request instruction passed the last thread rescheduling point prior to the pipeline stage in which the memory request could be made.

In an example, to deny the memory request, the PAU core 306 is configured to determine (e.g., detect) that there is a hazard on memory indicated in the memory request. Here, hazard denotes any condition such that allowing (e.g., performing) the memory request will result in an inconsistent state for the thread. In an example, the hazard is an in-flight memory request. Here, whether or not the data cache 310 includes data for the requested memory address, the presence of the in-flight memory request makes it uncertain what the data in the data cache 310 at that address should be. Thus, the thread must wait for the in-flight memory request to be completed to operate on current data. The hazard is cleared when the memory request completes.

In an example, the hazard is a dirty cache line in the data cache 310 for the requested memory address. Although the dirty cache line generally indicates that the data in the cache is current and the memory controller version of this data is not, an issue can arise on thread instructions that do not operate from the cache. An example of such an instruction uses a built-in atomic operator, or other separate hardware block, of the memory controller 314. In the context of a memory controller, the built-in atomic operators can be separate from the programmable atomic unit 302 and do not have access to the data cache 310 or instruction SRAM 308 inside the PAU. If the cache line is dirty, then the built-in atomic operator will not be operating on the most current data until the data cache 310 is flushed to synchronize the cache and the other or off-die memories. This same situation could occur with other hardware blocks of the memory controller, such as cryptography block, encoder, and so forth.

Figure 4:
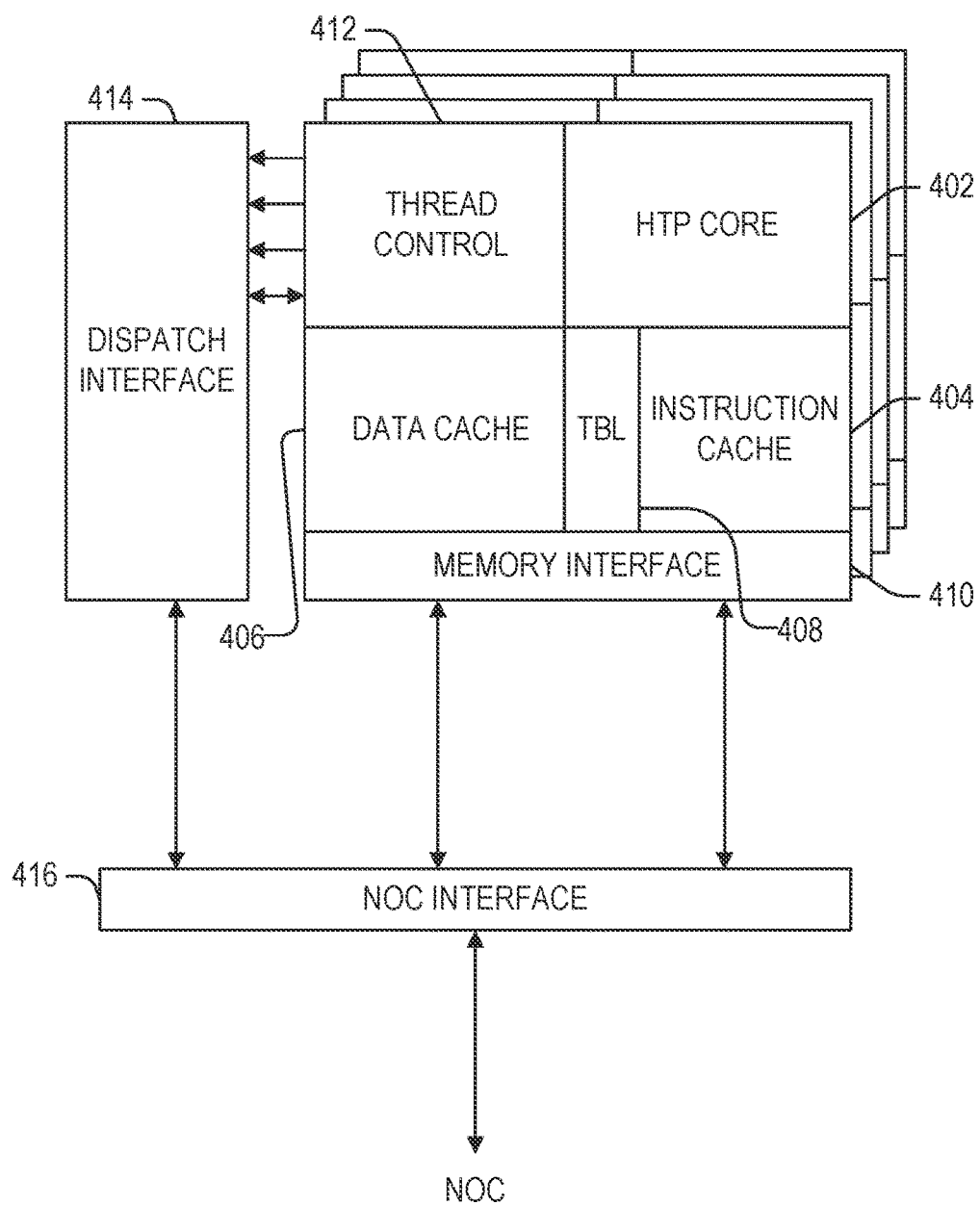
FIG. 4 illustrates an example of a hybrid threading processor (HTP) accelerator of a memory-compute device, according to an embodiment.

FIG. 4 illustrates an example of a HTP accelerator, or HTP accelerator 400. The HTP accelerator 400 can comprise a portion of a memory-compute device, according to an embodiment. In an example, the HTP accelerator 400 can include or comprise the HTP 140 from the example of FIG. 1. The HTP accelerator 400 includes, for example, a HTP core 402, an instruction cache 404, a data cache 406, a translation block 408, a memory interface 410, and a thread controller 412. The HTP accelerator 400 can further include a dispatch interface 414 and a NOC interface 416, such as for interfacing with a NOC such as the first NOC 118 from the example of FIG. 1, the second NOC 206 from the example of FIG. 2, or any other NOC.

In an example, the HTP accelerator 400 includes a module that is based on a RISC-V instruction set, and can include a relatively small number of other or additional custom instructions to support a low-overhead, threading-capable Hybrid Threading (HT) language. The HTP accelerator 400 can include a highly-threaded processor core, the HTP core 402, in which, or with which, threads can be executed in a single instruction rotation, such as to maintain high instruction throughput. In an example, a thread can be paused when it waits for other pending events to complete. This can allow the compute resources to be efficiently used on relevant work instead of polling. In an example, multiple-thread barrier synchronization can use efficient HTP-to-HTP and HTP-to/from-Host messaging, such as can allow thousands of threads to initialize or wake in, for example, tens of clock cycles.

In an example, the dispatch interface 414 can comprise a functional block of the HTP accelerator 400 for handling hardware-based thread management. That is, the dispatch interface 414 can manage dispatch of work to the HTP core 402 or other accelerators. Non-HTP accelerators, however, are generally not able to dispatch work. In an example, work dispatched from a host can use dispatch queues that reside in. e.g., host main memory (e.g., DRAM-based memory). Work dispatched from the HTP accelerator 400, on the other hand, can use dispatch queues that reside in SRAM, such as within the dispatches for the target HTP accelerator 400 within a particular node.

In an example, the HTP core 402 can comprise one or more cores that execute instructions on behalf of threads. That is, the HTP core 402 can include an instruction processing block. The HTP core 402 can further include, or can be coupled to, the thread controller 412. The thread controller 412 can provide thread control and state for each active thread within the HTP core 402. The data cache 406 can include cache for a host processor (e.g., for local and remote memory-compute devices, including for the HTP core 402), and the instruction cache 404 can include cache for use by the HTP core 402. In an example, the data cache 406 can be configured for read and write operations, and the instruction cache 404 can be configured for read only operations.

In an example, the data cache 406 is a small cache provided per hardware thread. The data cache 406 can temporarily store data for use by the owning thread. The data cache 406 can be managed by hardware or software in the HTP accelerator 400. For example, hardware can be configured to automatically allocate or evict lines as needed, as load and store operations are executed by the HTP core 402. Software, such as using RISC-V instructions, can determine which memory accesses should be cached, and when lines should be invalidated or written back to other memory locations.

Data caching on the HTP accelerator 400 has various benefits, including making larger accesses more efficient for the memory controller, allowing an executing thread to avoid stalling. However, there are situations when using the cache causes inefficiencies. An example includes accesses where data is accessed only once, and causes thrashing of the cache lines. To help address this problem, the HTP accelerator 400 can use a set of custom load instructions to force a load instruction to check for a cache hit and, on a cache miss, to issue a memory request for the requested operand and not put the obtained data in the data cache 406. The HTP accelerator 400 thus includes various different types of load instructions, including non-cached and cache line loads. The non-cached load instructions use the cached data if dirty data is present in the cache. The non-cached load instructions ignore clean data in the cache and do not write accessed data to the data cache. For cache line load instructions, the complete data cache line (e.g., comprising 64 bytes) can be loaded from memory into the data cache 406 and can load the addressed memory into a specified register. These loads can use the cached data if clean or dirty data is in the data cache 406. If the referenced memory location is not in the data cache 406, then the entire cache line can be accessed from memory. Use of the cache line load instructions can reduce cache misses when sequential memory locations are being referenced (such as memory copy operations) but can also waste memory and bandwidth at the NOC interface 416 if the referenced memory data is not used.

In an example, the HTP accelerator 400 includes a custom store instruction that is non-cached. The non-cached store instruction can help avoid thrashing the data cache 406 with write data that is not sequentially written to memory.

In an example, the HTP accelerator 400 further includes a translation block 408. The translation block 408 can include a virtual-to-physical translation block for local memory of a memory-compute device. For example, a host processor, such as in the HTP core 402, can execute a load or store instruction, and the instruction can generate a virtual address. The virtual address can be translated to a physical address of the host processor, such as using a translation table from the translation block 408. The memory interface 410, for example, can include an interface between the HTP core 402 and the NOC interface 416.

Figure 5:
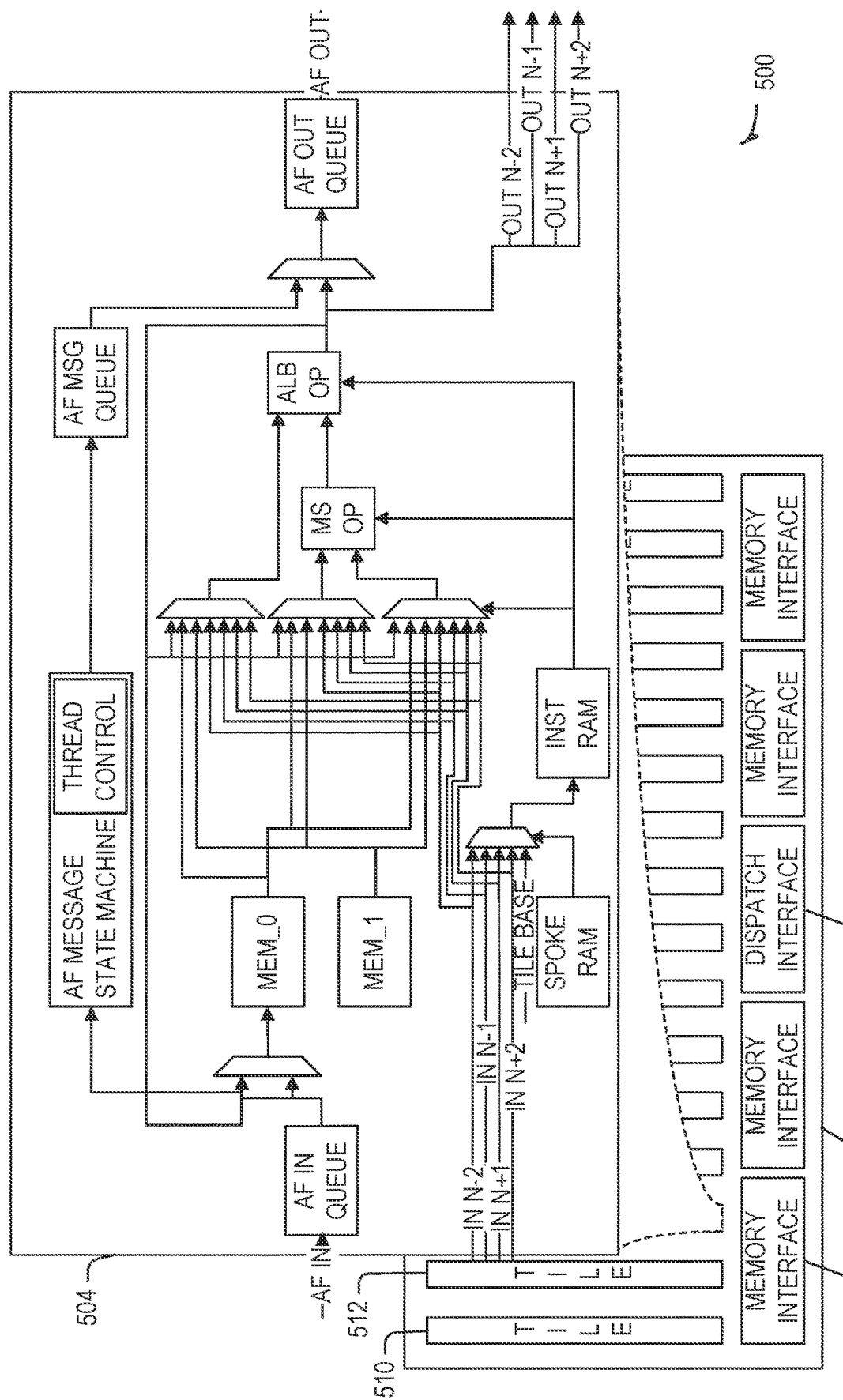
FIG. 5 illustrates an example of a representation of a hybrid threading fabric (HTF) of a memory-compute device, according to an embodiment.

FIG. 5 illustrates an example of a representation of an HTF 500 of a memory-compute device, according to an embodiment. In an example, the HTF 500 can include or comprise the HTF 142 from the example of FIG. 1. The HTF 500 is a coarse-grained, reconfigurable compute fabric that can be optimized for high-level language operand types and operators (e.g., using C/C++ or other high-level language). In an example, the HTF 500 can include configurable, n-bit wide (e.g., 512-bit wide) data paths that interconnect hardened SIMD arithmetic units.

In an example, the HTF 500 comprises an HTF cluster 502 that includes multiple HTF tiles, including an example tile 504, or Tile N. Each HTF tile can include one or more compute elements with local memory and arithmetic functions. For example, each tile can include a compute pipeline with support for integer and floating-point operations. In an example, the data path, compute elements, and other infrastructure can be implemented as hardened IP to provide maximum performance while minimizing power consumption and reconfiguration time.

In the example of FIG. 5, the tiles comprising the HTF cluster 502 are linearly arranged, and each tile in the cluster can be coupled to one or multiple other tiles in the HTF cluster 502. In the example of FIG. 5, the example tile 504, or Tile N, is coupled to four other tiles, including to a base tile 510 (e.g., Tile N−2) via the port labeled SF IN N−2, to an adjacent tile 512 (e.g., Tile N−1) via the port labeled SF IN N−1, and to a Tile N+1 via the port labeled SF IN N+1 and to a Tile N+2 via the port labeled SF IN N+2. The example tile 504 can be coupled to the same or other tiles via respective output ports, such as those labeled SF OUT N−1, SF OUT N−2, SF OUT N+1, and SF OUT N+2. In this example, the ordered list of names for the various tiles are notional indications of the positions of the tiles. In other examples, the tiles comprising the HTF cluster 502 can be arranged in a grid or other configuration, with each tile similarly coupled to one or several of its nearest neighbors in the grid. Tiles that are provided at an edge of a cluster can optionally have fewer connections to neighboring tiles. For example. Tile N−2, or the base tile 510 in the example of FIG. 5, can be coupled only to the adjacent tile 512 (Tile N−1) and to the example tile 504 (Tile N). Fewer or additional inter-tile connections can similarly be used.

The HTF cluster 502 can further include memory interface modules, including a first memory interface module 506. The memory interface modules can couple the HTF cluster 502 to a NOC, such as the first NOC 118. In an example, the memory interface modules can allow tiles within a cluster to make requests to other locations in a memory-compute system, such as in the same or different node in the system. That is, the representation of the HTF 500 can comprise a portion of a larger fabric that can be distributed across multiple nodes, such as with one or more HTF tiles or HTF clusters at each of the nodes. Requests can be made between tiles or nodes within the context of the larger fabric.

In the example of FIG. 5, the tiles in the HTF cluster 502 are coupled using a synchronous fabric (SF). The synchronous fabric can provide communication between a particular tile and its neighboring tiles in the HTF cluster 502, as described above. Each HTF cluster 502 can further include an asynchronous fabric (AF) that can provide communication among, e.g., the tiles in the cluster, the memory interfaces in the cluster, and a dispatch interface 508 in the cluster.

In an example, the synchronous fabric can exchange messages that include data and control information. The control information can include, among other things, instruction RAM address information or a thread identifier. The control information can be used to set up a data path, and a data message field can be selected as a source for the path. Generally, the control fields can be provided or received earlier, such that they can be used to configure the data path. For example, to help minimize any delay through the synchronous domain pipeline in a tile, the control information can arrive at a tile a few clock cycles before the data field. Various registers can be provided to help coordinate dataflow timing in the pipeline.

In an example, each tile in the HTF cluster 502 can include multiple memories. Each memory can have the same width as the data path (e.g., 512 bits) and can have a specified depth, such as in a range of 512 to 1024 elements. The tile memories can be used to store data that supports data path operations. The stored data can include constants loaded as part of a kernel's cluster configuration, for example, or can include variables calculated as part of the data flow. In an example, the tile memories can be written from the asynchronous fabric as a data transfer from another synchronous domain, or can include a result of a load operation such as initiated by another synchronous domain. The tile memory can be read via synchronous data path instruction execution in the synchronous domain.

In an example, each tile in an HTF cluster 502 can have a dedicated instruction RAM (INST RAM). In an example of an HTF cluster 502 with sixteen tiles, and instruction RAM instances with sixty-four entries, the cluster can allow algorithms to be mapped with up to 1024 multiply-shift and/or ALU operations. The various tiles can optionally be pipelined together, such as using the synchronous fabric, to allow data flow compute with minimal memory access, thus minimizing latency and reducing power consumption. In an example, the asynchronous fabric can allow memory references to proceed in parallel with computation, thereby providing more efficient streaming kernels. In an example, the various tiles can include built-in support for loop-based constructs and can support nested looping kernels.

The synchronous fabric can allow multiple tiles to be pipelined, such as without a need for data queuing. Tiles that participate in a synchronous domain can, for example, act as a single pipelined data path. A first or base tile (e.g., Tile N−2, in the example of FIG. 5) of a synchronous domain can initiate a thread of work through the pipelined tiles. The base tile can be responsible for starting work on a predefined cadence referred to herein as a Spoke Count. For example, if the Spoke Count is 3, then the base tile can initiate work every third clock cycle.

In an example, the synchronous domain comprises a set of connected tiles in the HTF cluster 502. Execution of a thread can begin at the domain's base tile and can progress from the base tile, via the synchronous fabric, to other tiles in the same domain. The base tile can provide the instruction to be executed for the first tile. The first tile can, by default, provide the same instruction for the other connected tiles to execute. However, in some examples, the base tile, or a subsequent tile, can conditionally specify or use an alternative instruction. The alternative instruction can be chosen by having the tile's data path produce a Boolean conditional value and then can use the Boolean value to choose between an instruction set of the current tile and the alternate instruction.

The asynchronous fabric can be used to perform operations that occur asynchronously relative to a synchronous domain. Each tile in the HTF cluster 502 can include an interface to the asynchronous fabric. The inbound interface can include, for example, a FIFO buffer or queue (e.g., AF IN QUEUE) to provide storage for messages that cannot be immediately processed. Similarly, the outbound interface of the asynchronous fabric can include a FIFO buffer or queue (e.g., AF OUT QUEUE) to provide storage for messages that cannot be immediately sent out.

In an example, messages in the AF can be classified as data messages or control messages. Data messages can include a SIMD width data value that is written to either tile memory 0 (MEM_0) or memory 1 (MEM_1). Control messages can be configured to control thread creation, free resources, or issue external memory references.

A tile in the HTF cluster 502 can perform various compute operations for the HTF. The compute operations can be performed by configuring the data path within the tile. In an example, a tile includes two functional blocks that perform the compute operations for the tile: a Multiply and Shift Operation block (MS OP) and an Arithmetic, Logical, and Bit Operation block (ALB OP). The two blocks can be configured to perform pipelined operations such as a Multiply and Add, or a Shift and Add, among others.

In an example, each instance of a memory-compute device in a system can have a complete supported instruction set for its operator blocks (e.g., MS OP and ALB OP). In this case, binary compatibility can be realized across all devices in the system. However, in some examples, it can be helpful to maintain a base set of functionality and optional instruction set classes, such as to meet various design tradeoffs, such as die size. The approach can be similar to how the RISC-V instruction set has a base set and multiple optional instruction subsets.

In an example, the example tile 504 can include a Spoke RAM. The Spoke RAM can be used to specify which input (e.g., from among the four SF tile inputs and the base tile input) is the primary input for each clock cycle. The Spoke RAM read address input can originate at a counter that counts from zero to Spoke Count minus one. In an example, different spoke counts can be used on different tiles, such as within the same HTF cluster 502, to allow a number of slices, or unique tile instances, used by an inner loop to determine the performance of a particular application or instruction set. In an example, the Spoke RAM can specify when a synchronous input is to be written to a tile memory, for instance when multiple inputs for a particular tile instruction are used and one of the inputs arrives before the others. The early-arriving input can be written to the tile memory and can be later read when all of the inputs are available. In this example, the tile memory can be accessed as a FIFO memory, and FIFO read and write pointers can be stored in a register-based memory region or structure in the tile memory.

FIG. 6A and FIG. 6B illustrate generally an example of a chiplet system that can be used to implement one or more aspects of the CNM system 102. As similarly mentioned above, a node in the CNM system 102, or a device within a node in the CNM system 102, can include a chiplet-based architecture or CNM chiplet. A packaged memory-compute device can include, for example, one, two, or four CNM chiplets. The chiplets can be interconnected using high-bandwidth, low-latency interconnects such as using a CPI interface. Generally, a chiplet system is made up of discrete modules (each a "chiplet") that are integrated on an interposer and, in many examples, are interconnected as desired through one or more established networks to provide a system with the desired functionality. The interposer and included chiplets can be packaged together to facilitate interconnection with other components of a larger system. Each chiplet can include one or more individual integrated circuits (ICs), or "chips." potentially in combination with discrete circuit components, and can be coupled to a respective substrate to facilitate attachment to the interposer. Most or all chiplets in a system can be individually configured for communication through established networks.

The configuration of chiplets as individual modules of a system is distinct from such a system being implemented on single chips that contain distinct device blocks (e.g., intellectual property (IP) blocks) on one substrate (e.g., single die), such as a system-on-a-chip (SoC), or multiple discrete packaged devices integrated on a printed circuit board (PCB). In general, chiplets provide better performance (e.g., lower power consumption, reduced latency, etc.) than discrete packaged devices, and chiplets provide greater production benefits than single die chips. These production benefits can include higher yields or reduced development costs and time.

Chiplet systems can include, for example, one or more application (or processor) chiplets and one or more support chiplets. Here, the distinction between application and support chiplets is simply a reference to the likely design scenarios for the chiplet system. Thus, for example, a synthetic vision chiplet system can include, by way of example only, an application chiplet to produce the synthetic vision output along with support chiplets, such as a memory controller chiplet, a sensor interface chiplet, or a communication chiplet. In a typical use case, the synthetic vision designer can design the application chiplet and source the support chiplets from other parties. Thus, the design expenditure (e.g., in terms of time or complexity) is reduced because by avoiding the design and production of functionality embodied in the support chiplets.

Chiplets also support the tight integration of IP blocks that can otherwise be difficult, such as those manufactured using different processing technologies or using different feature sizes (or utilizing different contact technologies or spacings). Thus, multiple ICs or IC assemblies, with different physical, electrical, or communication characteristics can be assembled in a modular manner to provide an assembly with various desired functionalities. Chiplet systems can also facilitate adaptation to suit the needs of different larger systems into which the chiplet system will be incorporated. In an example, ICs or other assemblies can be optimized for the power, speed, or heat generation for a specific function—as can happen with sensors—can be integrated with other devices more easily than attempting to do so on a single die. Additionally, by reducing the overall size of the die, the yield for chiplets tends to be higher than that of more complex, single die devices.

FIG. 6A and FIG. 6B illustrate generally an example of a chiplet system, according to an embodiment. FIG. 6A is a representation of the chiplet system 602 mounted on a peripheral board 604, that can be connected to a broader computer system by a (PCIe, for example. The chiplet system 602 includes a package substrate 606, an interposer 608, and four chiplets: an application chiplet 610, a host interface chiplet 612, a memory controller chiplet 614, and a memory device chiplet 616. Other systems can include many additional chiplets to provide additional functionalities as will be apparent from the following discussion. The package of the chiplet system 602 is illustrated with a lid or cover 618, though other packaging techniques and structures for the chiplet system can be used. FIG. 6B is a block diagram labeling the components in the chiplet system for clarity.

The application chiplet 610 is illustrated as including a chiplet system NOC 620 to support a chiplet network 622 for inter-chiplet communications. In example embodiments, the chiplet system NOC 620 can be included on the application chiplet 610. In an example, the first NOC 118 from the example of FIG. 1 can be defined in response to selected support chiplets (e.g., host interface chiplet 612, memory controller chiplet 614, and memory device chiplet 616), thus enabling a designer to select an appropriate number of chiplet network connections or switches for the chiplet system NOC 620. In an example, the chiplet system NOC 620 can be located on a separate chiplet, or within the interposer 608. In examples as discussed herein, the chiplet system NOC 620 implements a CPI network.

In an example, the chiplet system 602 can include or comprise a portion of the first memory-compute node 104 or the first memory-compute device 112. That is, the various blocks or components of the first memory-compute device 112 can include chiplets that can be mounted on the peripheral board 604, the package substrate 606, and the interposer 608. The interface components of the first memory-compute device 112 can comprise, generally, the host interface chiplet 612. The memory and memory control-related components of the first memory-compute device 112 can comprise, generally, the memory controller chiplet 614. The various accelerator and processor components of the first memory-compute device 112 can comprise, generally, the application chiplet 610 or instances thereof, and so on.

The CPI interface, such as can be used for communication between or among chiplets in a system, is a packet-based network that supports virtual channels to enable a flexible and high-speed interaction between chiplets. CPI enables bridging from intra-chiplet networks to the chiplet network 622. For example, the AXI is a widely used specification to design intra-chip communications. AXI specifications, however, cover a great variety of physical design options, such as the number of physical channels, signal timing, power, and so forth. Within a single chip, these options are generally selected to meet design goals, such as power consumption, speed, and so forth. However, to achieve the flexibility of the chiplet system, an adapter, such as CPI, is used to interface between the various AXI design options that can be implemented in the various chiplets. By enabling a physical channel to virtual channel mapping and encapsulating time-based signaling with a packetized protocol, CPI bridges intra-chiplet networks across the chiplet network 622.

CPI can use a variety of different physical layers to transmit packets. The physical layer can include simple conductive connections, drivers to increase the voltage, or otherwise facilitate transmitting the signals over longer distances. An example of one such a physical layer can include the Advanced Interface Bus (AIB), which, in various examples, can be implemented in the interposer 608. AIB transmits and receives data using source synchronous data transfers with a forwarded clock. Packets are transferred across the AIB at single data rate (SDR) or dual data rate (DDR) with respect to the transmitted clock. Various channel widths are supported by AIB. The channel can be configured to have a symmetrical number of transmit (TX) and receive (RX) input/outputs (I/Os) or have a non-symmetrical number of transmitters and receivers (e.g., either all transmitters or all receivers). The channel can act as an AIB principal or subordinate depending on which chiplet provides the principal clock. AIB I/O cells support three clocking modes: asynchronous (i.e., non-clocked), SDR, and DDR. In various examples, the non-clocked mode is used for clocks and some control signals. The SDR mode can use dedicated SDR only I/O cells or dual use SDR/DDR I/O cells.

In an example, CPI packet protocols (e.g., point-to-point or routable) can use symmetrical receive and transmit I/O cells within an AIB channel. The CPI streaming protocol allows more flexible use of the AIB I/O cells. In an example, an AIR channel for streaming mode can configure the I/O cells as all TX, all RX, or half TX and half RX. CPI packet protocols can use an AIB channel in either SDR or DDR operation mode. In an example, the AIB channel is configured in increments of 80 I/O cells (i.e., 40 TX and 40 RX) for SDR mode and 40 I/O cells for DDR mode. The CPI streaming protocol can use an AIB channel in either SDR or DDR operation modes. Here, in an example, the AIB channel is in increments of 40 I/O cells for both SDR and DDR modes. In an example, each AIB channel is assigned a unique interface identifier. The identifier is used during CPI reset and initialization to determine paired AIR channels across adjacent chiplets. In an example, the interface identifier is a 20-bit value comprising a seven-bit chiplet identifier, a seven-bit column identifier, and a six-bit link identifier. The AIB physical layer transmits the interface identifier using an AIB out-of-band shift register. The 20-bit interface identifier is transferred in both directions across an AIB interface using bits 32-51 of the shift registers.

AIB defines a stacked set of AIB channels as an AIR channel column. An AIB channel column has some number of AIB channels plus an auxiliary channel. The auxiliary channel contains signals used for AIB initialization. All AIR channels (other than the auxiliary channel) within a column are of the same configuration (e.g., all TX, all RX, or half TX and half RX), as well as having the same number of data I/O signals. In an example, AIB channels are numbered in continuous increasing order starting with the AIR channel adjacent to the AUX channel. The AIB channel adjacent to the AUX is defined to be AIB channel zero.

Generally. CPI interfaces on individual chiplets can include serialization-deserialization (SERDES) hardware. SERDES interconnects work well for scenarios in which high-speed signaling with low signal count is desirable. SERDES, however, can result in additional power consumption and longer latencies for multiplexing and demultiplexing, error detection or correction (e.g., using block level cyclic redundancy checking (CRC)), link-level retry, or forward error correction. However, when low latency or energy consumption is a primary concern for ultra-short reach, chiplet-to-chiplet interconnects, a parallel interface with clock rates that allow data transfer with minimal latency can be utilized. CPI includes elements to minimize both latency and energy consumption in these ultra-short reach chiplet interconnects.

For flow control. CPI employs a credit-based technique. A recipient, such as the application chiplet 610, provides a sender, such as the memory controller chiplet 614, with credits that represent available buffers. In an example, a CPI recipient includes a buffer for each virtual channel for a given time-unit of transmission. Thus, if the CPI recipient supports five messages in time and a single virtual channel, the recipient has five buffers arranged in five rows (e.g., one row for each unit time). If four virtual channels are supported, then the recipient has twenty buffers arranged in five rows. Each buffer holds the payload of one CPI packet.

When the sender transmits to the recipient, the sender decrements the available credits based on the transmission. Once all credits for the recipient are consumed, the sender stops sending packets to the recipient. This ensures that the recipient always has an available buffer to store the transmission.

As the recipient processes received packets and frees buffers, the recipient communicates the available buffer space back to the sender. This credit return can then be used by the sender to allow transmitting of additional information.

The example of FIG. 6A includes a chiplet mesh network 624 that uses a direct, chiplet-to-chiplet technique without a need for the chiplet system NOC 620. The chiplet mesh network 624 can be implemented in CPI or another chiplet-to-chiplet protocol. The chiplet mesh network 624 generally enables a pipeline of chiplets where one chiplet serves as the interface to the pipeline while other chiplets in the pipeline interface only with themselves.

Additionally, dedicated device interfaces, such as one or more industry standard memory interfaces (such as, for example, synchronous memory interfaces, such as DDR5. DDR6), can be used to connect a device to a chiplet. Connection of a chiplet system or individual chiplets to external devices (such as a larger system) can be through a desired interface (for example, a PCIe interface). Such an external interface can be implemented, in an example, through the host interface chiplet 612, which, in the depicted example, provides a PCIe interface external to the chiplet system. Such dedicated chiplet interfaces 626 are generally employed when a convention or standard in the industry has converged on such an interface. The illustrated example of a DDR interface connecting the memory controller chiplet 614 to a DRAM memory device chiplet 616 is just such an industry convention.

Of the variety of possible support chiplets, the memory controller chiplet 614 is likely present in the chiplet system due to the near omnipresent use of storage for computer processing as well as sophisticated state-of-the-art for memory devices. Thus, using memory device chiplets 616 and memory controller chiplets 614 produced by others gives chiplet system designers access to robust products by sophisticated producers. Generally, the memory controller chiplet 614 provides a memory device-specific interface to read, write, or erase data. Often, the memory controller chiplet 614 can provide additional features, such as error detection, error correction, maintenance operations, or atomic operator execution. For some types of memory, maintenance operations tend to be specific to the memory device chiplet 616, such as garbage collection in NAND flash or storage class memories and temperature adjustments (e.g., cross temperature management) in NAND flash memories. In an example, the maintenance operations can include logical-to-physical (L2P) mapping or management to provide a level of indirection between the physical and logical representation of data. In other types of memory, for example DRAM, some memory operations, such as refresh, can be controlled by a host processor or a memory controller at some times, and at other times, controlled by the DRAM memory device, or by logic associated with one or more DRAM devices, such as an interface chip (in an example, a buffer).

Atomic operators are a data manipulation that, for example, can be performed by the memory controller chiplet 614. In other chiplet systems, the atomic operators can be performed by other chiplets. For example, an atomic operator of "increment" can be specified in a command by the application chiplet 610, the command including a memory address and possibly an increment value. Upon receiving the command, the memory controller chiplet 614 retrieves a number from the specified memory address, increments the number by the amount specified in the command, and stores the result. Upon a successful completion, the memory controller chiplet 614 provides an indication of the command success to the application chiplet 610. Atomic operators avoid transmitting the data across the chiplet mesh network 624, resulting in lower latency execution of such commands.

Atomic operators can be classified as built-in atomics or programmable (e.g., custom) atomics. Built-in atomics are a finite set of operations that are immutably implemented in hardware. Programmable atomics are small programs that can execute on a PAU (e.g., a custom atomic unit (CAU)) of the memory controller chiplet 614.

The memory device chiplet 616 can be, or include any combination of, volatile memory devices or non-volatile memories. Examples of volatile memory devices include, but are not limited to, RAM, such as DRAM, synchronous DRAM (SDRAM), and GDDR6 SDRAM, among others. Examples of non-volatile memory devices include, but are not limited to, NAND-type flash memory and storage class memory (e.g., phase-change memory or memristor based technologies, ferroelectric RAM (FeRAM), among others. The illustrated example includes the memory device chiplet 616 as a chiplet; however, the device can reside elsewhere, such as in a different package on the peripheral board 604. For many applications, multiple memory device chiplets can be provided. In an example, these memory device chiplets can each implement one or multiple storage technologies and may include integrated compute hosts. In an example, a memory chiplet can include multiple stacked memory die of different technologies (for example, one or more SRAM devices stacked or otherwise in communication with one or more DRAM devices). In an example, the memory controller chiplet 614 can serve to coordinate operations between multiple memory chiplets in the chiplet system 602 (for example, to use one or more memory chiplets in one or more levels of cache storage, and to use one or more additional memory chiplets as main memory). The chiplet system 602 can include multiple memory controller chiplet 614 instances, as can be used to provide memory control functionality for separate hosts, processors, sensors, networks, and so forth. A chiplet architecture, such as in the illustrated system, offers advantages in allowing adaptation to different memory storage technologies and different memory interfaces, through updated chiplet configurations, such as without requiring redesign of the remainder of the system structure.

Figure 7:
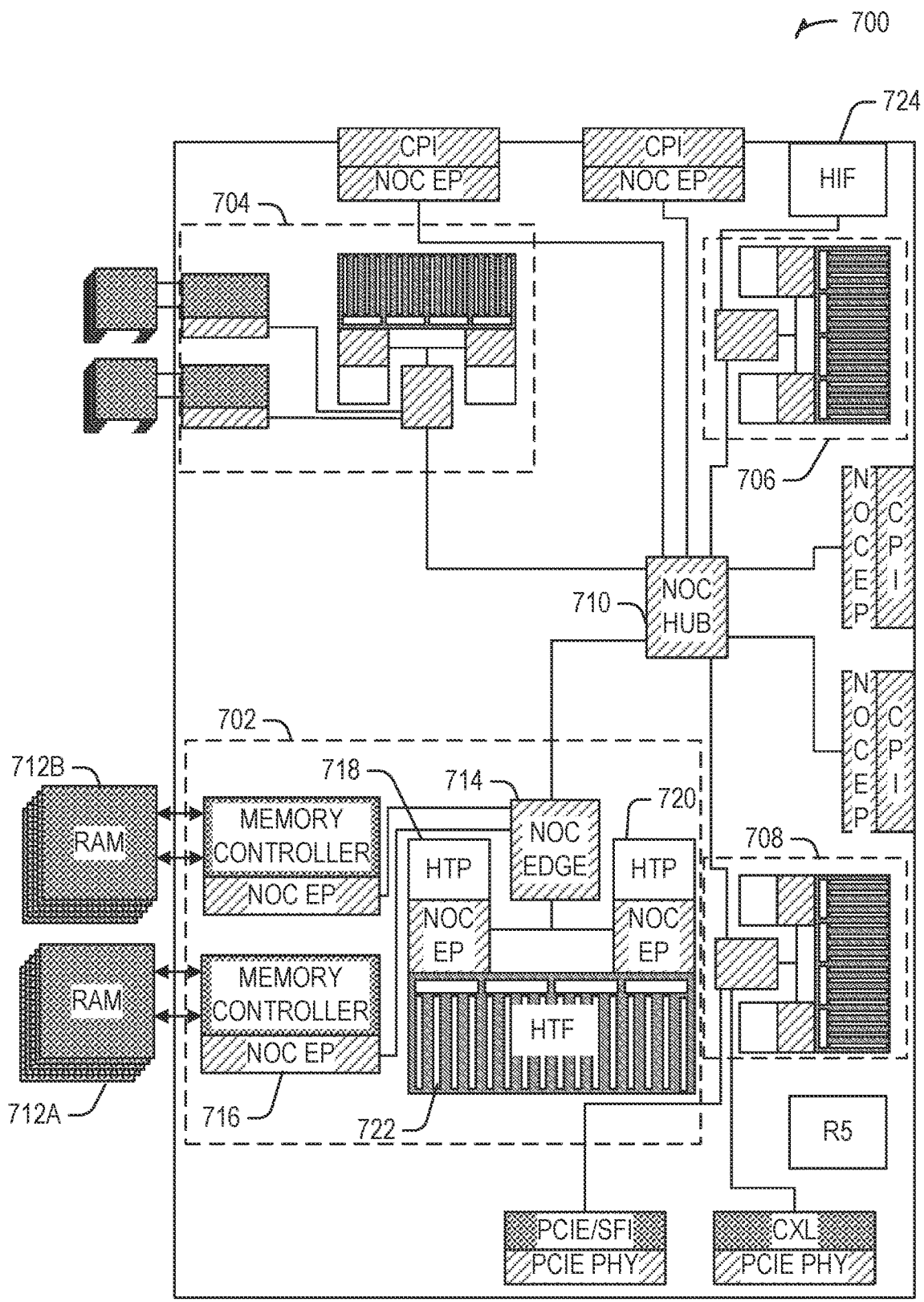
FIG. 7 illustrates generally an example of a chiplet-based implementation for a memory-compute device, according to an embodiment.

FIG. 7 illustrates generally an example of a chiplet-based implementation for a memory-compute device, according to an embodiment. The example includes an implementation with four CNM chiplets, and each of the CNM chiplets can include or comprise portions of the first memory-compute device 112 or the first memory-compute node 104 from the example of FIG. 1. The various portions can themselves include or comprise respective chiplets. The chiplet-based implementation can include or use CPI-based intra-system communications, as similarly discussed above in the example chiplet system 602 from FIG. 6A and FIG. 6B.

The example of FIG. 7 includes a first CNM package 700 comprising multiple chiplets. The first CNM package 700 includes a first chiplet 702, a second chiplet 704, a third chiplet 706, and a fourth chiplet 708, all coupled to a CNM NOC hub 710. Each of the first through fourth chiplets can comprise instances of the same, or substantially the same, components or modules. For example, the chiplets can each include respective instances of an HTP accelerator, an HTF accelerator, and memory controllers for accessing internal or external memories.

In the example of FIG. 7, the first chiplet 702 includes a first NOC hub edge 714 coupled to the CNM NOC hub 710. The other chiplets in the first CNM package 700 similarly include NOC hub edges or endpoints. The switches in the NOC hub edges facilitate intra-chiplet, or intra-chiplet-system, communications via the CNM NOC hub 710.

The first chiplet 702 can further include one or multiple memory controllers 716. The memory controllers 716 can correspond to respective different NOC endpoint switches interfaced with the first NOC hub edge 714. In an example, the memory controller 716 comprises the memory controller chiplet 614, the memory controller 130, the memory subsystem 200, or other memory-compute implementation. The memory controllers 716 can be coupled to respective different memory devices, for example including a first external memory module 712a or a second external memory module 712b. The external memory modules can include. e.g., GDDR6 memories that can be selectively accessed by the respective different chiplets in the system.

The first chiplet 702 can further include a first HTP chiplet 718 and second HTP chiplet 720, such as coupled to the first NOC hub edge 714 via respective different NOC endpoint switches. The HTP chiplets can correspond to HTP accelerators, such as the HTP 140 from the example of FIG. 1, or the HTP accelerator 400 from the example of FIG. 4. The HTP chiplets can communicate with the HTF chiplet 722. The HTF chiplet 722 can correspond to an HTF accelerator, such as the HTF 142 from the example of FIG. 1, or the HTF 500 from the example of FIG. 5.

The CNM NOC hub 710 can be coupled to NOC hub instances in other chiplets or other CNM packages by way of various interfaces and switches. For example, the CNM NOC hub 710 can be coupled to a CPI interface by way of multiple different NOC endpoints on the first CNM package 700. Each of the multiple different NOC endpoints can be coupled, for example, to a different node outside of the first CNM package 700. In an example, the CNM NOC hub 710 can be coupled to other peripherals, nodes, or devices using CTCPI or other, non-CPI protocols. For example, the first CNM package 700 can include a PCIe scale fabric interface (PCIE/SFI) or a CXL interface configured to interface the first CNM package 700 with other devices. In an example, devices to which the first CNM package 700 is coupled using the various CPI, PCIe. CXL, or other fabric, can make up a common global address space.

In the example of FIG. 7, the first CNM package 700 includes a host interface 724 (HIF) and a host processor (R5). The host interface 724 can correspond to, for example, the HIF 120 from the example of FIG. 1. The host processor, or R5, can correspond to the internal host processor 122 from the example of FIG. 1. The host interface 724 can include a PCI interface for coupling the first CNM package 700 to other external devices or systems. In an example, work can be initiated on the first CNM package 700, or a tile cluster within the first CNM package 700, by the host interface 724. For example, the host interface 724 can be configured to command individual HTF tile clusters, such as among the various chiplets in the first CNM package 7), into and out of power/clock gate modes.

Figure 8:
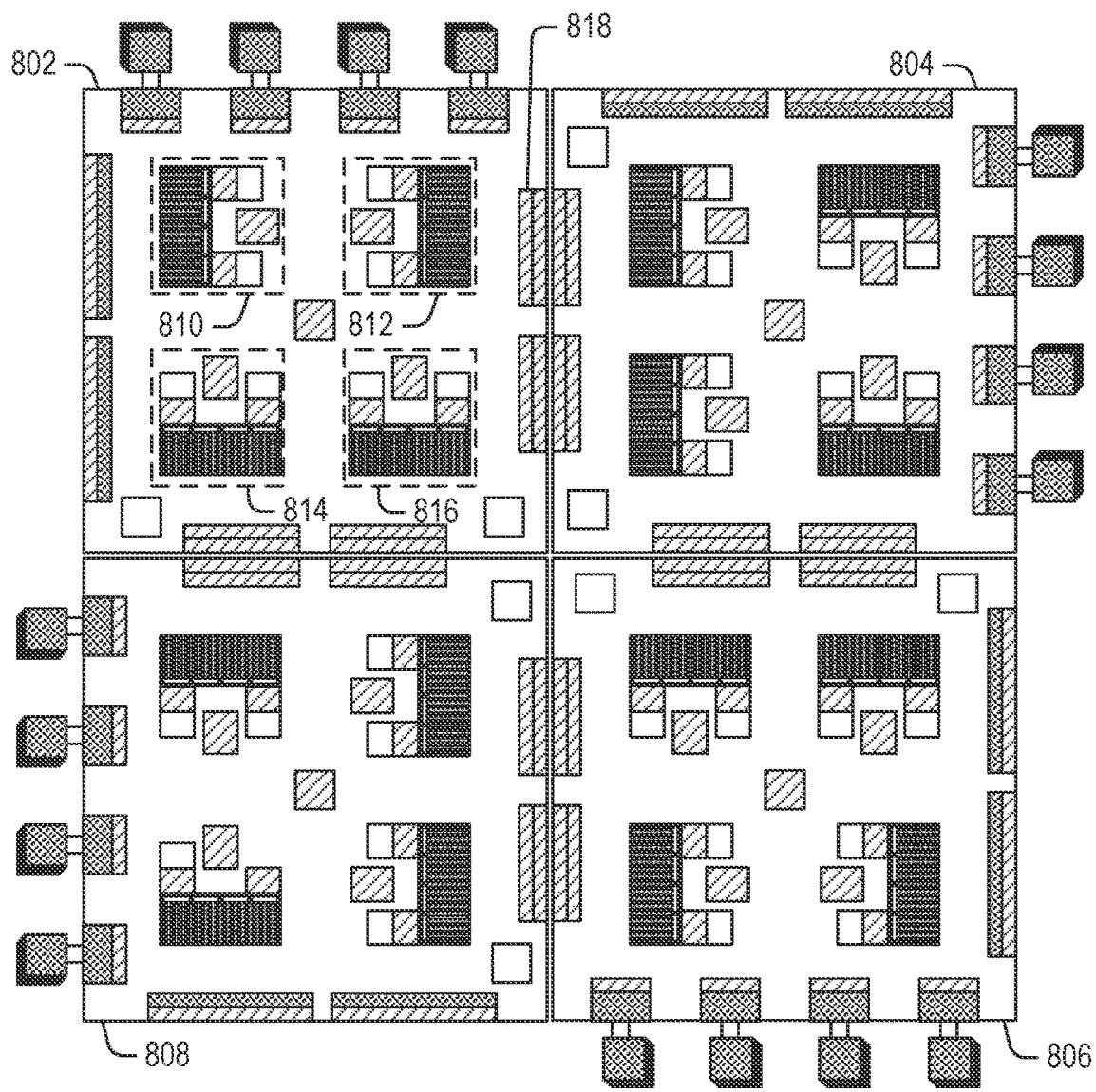
FIG. 8 illustrates an example tiling of memory-compute device chiplets, according to an embodiment.

FIG. 8 illustrates an example tiling of memory-compute devices, according to an embodiment. In FIG. 8, a tiled chiplet example 800 includes four instances of different CNM clusters of chiplets, where the clusters are coupled together. Each instance of a CNM chiplet can itself include one or more constituent chiplets (e.g., host processor chiplets, memory device chiplets, interface chiplets, and so on).

The tiled chiplet example 800 includes, as one or multiple of its CNM clusters, instances of the first CNM package 700 from the example of FIG. 7. For example, the tiled chiplet example 800 can include a first CNM cluster 802 that includes a first chiplet 810 (e.g., corresponding to the first chiplet 702), a second chiplet 812 (e.g., corresponding to the second chiplet 704), a third chiplet 814 (e.g., corresponding to the third chiplet 706), and a fourth chiplet 816 (e.g., corresponding to the fourth chiplet 708). The chiplets in the first CNM cluster 802 can be coupled to a common NOC hub, which in turn can be coupled to a NOC hub in an adjacent cluster or clusters (e.g., in a second CNM cluster 804 or a fourth CNM cluster 808).

In the example of FIG. 8, the tiled chiplet example 800 includes the first CNM cluster 802, the second CNM cluster 804, a third CNM cluster 806, and the fourth CNM cluster 808. The various different CNM chiplets can be configured in a common address space such that the chiplets can allocate and share resources across the different tiles. In an example, the chiplets in the cluster can communicate with each other. For example, the first CNM cluster 802 can be communicatively coupled to the second CNM cluster 804 via an inter-chiplet CPI interface 818, and the first CNM cluster 802 can be communicatively coupled to the fourth CNM cluster 808 via another or the same CPI interface. The second CNM cluster 804 can be communicatively coupled to the third CNM cluster 806 via the same or other CPI interface, and so on.

In an example, one of the CNM chiplets in the tiled chiplet example 800 can include a host interface (e.g., corresponding to the host interface 724 from the example of FIG. 7) that is responsible for workload balancing across the tiled chiplet example 800. The host interface can facilitate access to host-based command request queues and response queues, such as from outside of the tiled chiplet example 800. The host interface can dispatch new threads of execution using hybrid threading processors and the hybrid threading fabric in one or more of the CNM chiplets in the tiled chiplet example 800.

Figure 9:
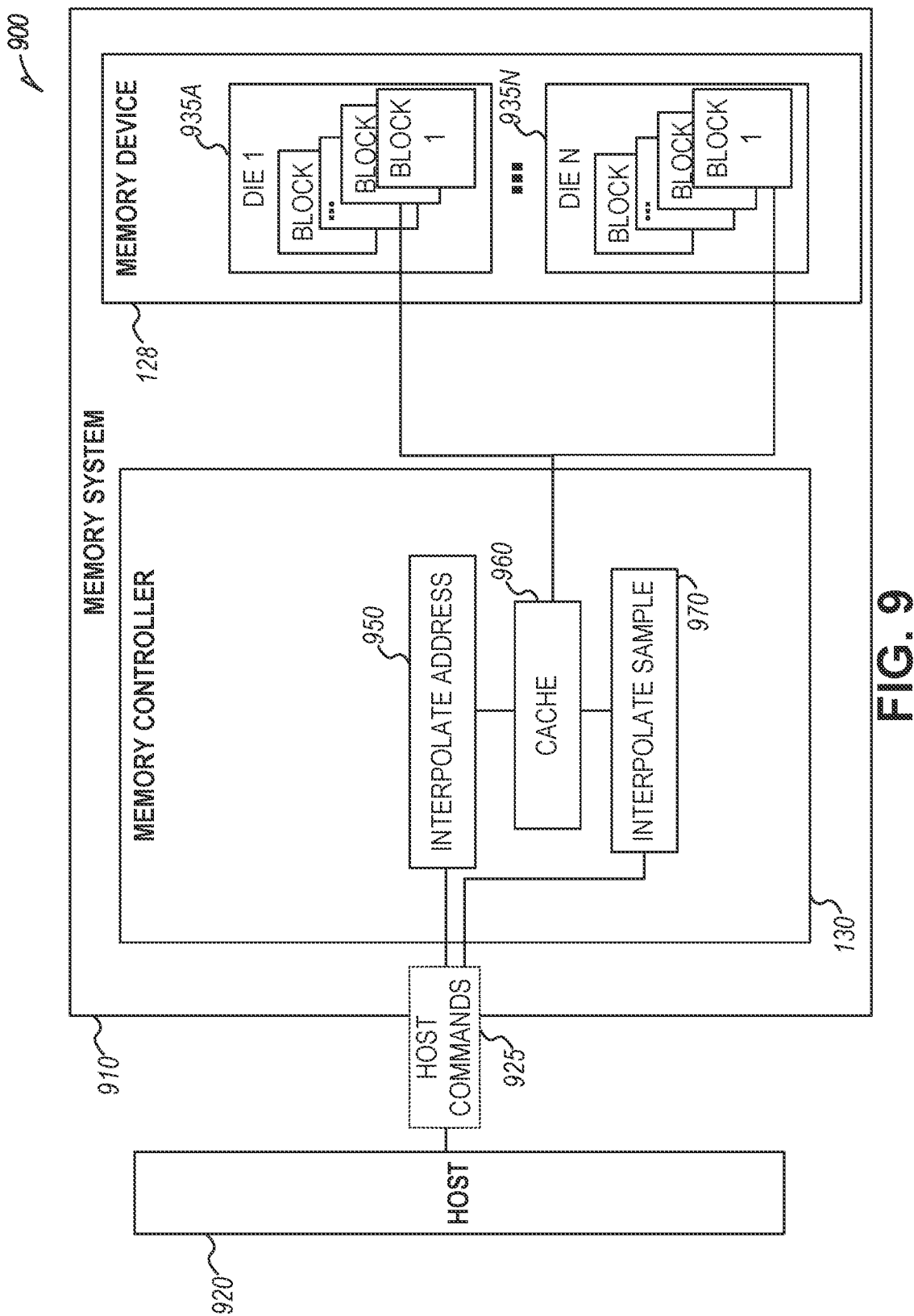
FIG. 9 is a block diagram of an example memory system adapted for performing interpolation within the memory system.

FIG. 9 is a block diagram 900 of an example memory system 910 adapted for performing interpolation within the memory system. The memory system 910 includes the memory controller 130 and the memory device 128, both of which are also shown in FIG. 1. The memory controller 130 is configured to process host commands 925 received from a host 920 via a bus. Processing the host commands 925 may include interpolating a memory address (operation 950), accessing data from a cache (operation 960), and interpolating a sample (operation 970). If the data is not available in the cache (e.g., the local cache module 212 of FIG. 2), the data may be loaded from the memory device 128.

The host command may be an interpolated access initialization command. The interpolated access initialization command identifies an integer-indexed memory array stored in the memory device 128. For example, an address for a first element of the memory array and a number of elements in the memory array may be included in the interpolated access initialization command. The address and number of elements may be stored in the local cache module 212 or in another memory element (e.g., a register file) in the memory controller 130.

The host command may be a request to access interpolated data, comprising a floating-point index into the integer-indexed memory array. For example, an array of data (e.g., integer data, floating-point single-precision real data, floating-point double-precision complex data, vector data, or any suitable combination thereof) may have ten elements, indexed with integer values 0 to 9. The request may be for the value of a floating-point index in the range 0-9. To illustrate, the floating-point index of 1.7 may be received.

In operation 950, the memory controller 130 determines the address or addresses within the memory device 128 to be accessed to handle the request. If the index is not equal to one of the indices used for storage of the array, the two adjacent indices (and their corresponding addresses) are identified. For example, if the base address of the array is 0x1000, the size of each element is 8 bytes, and the index is 1.7, the two adjacent addresses are 0x1008 and 0x1010. As used herein, the prefix 0x indicates that the number that follows is in hexadecimal notation.

The data values from the identified addresses are retrieved from the local cache module 212 (operation 960). In the event that the local cache module 212 does not already store the values (e.g., in case of a cache miss), the data from the two addresses are read from the memory device 128 of FIG. 1 or the memory device 204 of FIG. 2 and stored in the local cache module 212.

In operation 970, the memory controller 130 interpolates the requested sample. For example, if the value for index 1 is 20 and the value for index 2 is 30, the interpolated value for index 1.7 is 27. The interpolated value may be found using the pseudo-code below:

```
void linearInterpolateFloat (
    const int numElements,
    const double *dataP0,
    float *sample,
    const double bin)
{
    int bin_floor = (int)floor(bin);
    float w = (float) (bin - bin_floor);
    if (bin_floor >= 0 && bin_floor < numElements) {
        float tmp1 = 1.0f - w;
        float tmp2 = tmp1 * dataP0[bin_floor];
        sample = tmp2 + w * dataP0[bin_floor+1];
    } else {
        sample = sample = 0.0;
    }
}
```

In the example above, the numElements and dataP0 parameters were defined by the initialization command, bin is the index provided with the interpolated read request, and sample is the output result of the interpolation. The linearInterpolateFloat function determines an interpolated float output value for an array of double values, as indicated by the types of sample and dataP0, respectively. The values generated using interpolation may be less accurate than measured values stored in the array. Accordingly, reducing the precision of the output value may save memory bandwidth and storage with little reduction in computational accuracy. The linearInterpolateFloat function performs bounds checking on the floating-point index (after converting it to the integer bin_floor) to avoid accessing data values outside of the array. If the bounds check fails, a value of zero is provided. Thus, the processing element invoking the linear interpolation function on the memory controller 130 does not need to perform its own bounds checking prior to invoking the linear interpolation function to avoid the possibility of an invalid memory access.

The linear interpolation is performed by determining a first weight (w) for a first value (dataP0[bin_floor]) and a second weight (1.0f-w, wherein the "f" suffix indicates that 1.0 is treated as a single-precision floating-point value) for a second value (dataP0[bin_floor+1]). The two values are multiplied by their respective weights and the results are summed to give the linearly interpolated value.

Linear interpolation may also be performed on complex values using the pseudo-code below:

```
void linearInterpolateComplex (
    const int numElements,
    const complex_double *dataP0,
    complex_float *sample,
    const double bin)
{
```

```
      int bin_floor = (int)floor(bin);
      float w = (float) (bin - bin_floor);
      if (bin_floor >= 0 && bin_floor < numElements) {
         double tmp1 = 1.0f - w;
         double tmp2 = tmp1 * dataP0[bin_floor].real;
         sample.real = tmp2 + w * dataP0[bin_floor+1].real;
         double tmp2 = tmp1 * dataP0[bin_floor].complex;
         sample. complex = tmp2 + w * dataP0[bin_floor+1].complex;
      } else {
         sample.real = sample.complex = 0.0;
      }
   }
}
```

The linearInterpolateComplex function is similar to the linearInterpolateReal function, but the array and the output value are complex data types instead of real numbers. As a complex number may be thought of as a vector of length two, it can be seen that the method above can be extended to provide linear interpolation of vectors of arbitrary lengths (e.g., three dimensions, four dimensions, ten dimensions, or one hundred dimensions). The complex_float data type is a single-precision complex number (e.g., comprising two floating-point numbers stored using 32 bits each). The complex_double data type is a double-precision complex number (e.g., comprising two double-precision floating-point numbers stored using 64 bits each).

In some example embodiments, the data being interpolated is stored in a two-dimensional array. The request for interpolated data may include an integer index for one of the two dimensions (or for N−1 dimensions of an N-dimensional array) and a floating-point index into the remaining dimension. Pseudo-code for this case is presented below.

```
void linearInterpolate2D (
   const sar_consts1_t * sConsts1,
   const sar_consts2_t *sConsts2,
   const uint64_t pIdx,
   const double bin,
   complex_float *sample)
{
   complex *dataP0 = sConsts2->data[pIdx];
   int bin_floor = (int)floor(bin);
   float w = (float) (bin - bin_floor);
   if (bin_floor >= 0 && bin_floor < sConsts1->dataElements - 1) {
      double tmp1 = 1.0f - w;
      double tmp2 = tmp1 * dataP0[bin_floor].real;
      sample.real = tmp2 + w * dataP0[bin_floor+1].real;
      double tmp2 = tmp1 * dataP0[bin_floor].complex;
      sample. complex = tmp2 + w * dataP0[bin_floor+1].complex;
   } else {
      sample.real = sample.complex = 0.0;
   }
}
```

In some example embodiments, pIdx is provided as part of the initialization command. In other example embodiments, pIdx is provided as part of the interpolation request. The two-dimensional data is stored in sConsts2 (provided as part of the initialization command). The size of the dimension being interpolated is stored in sConsts1→numElements. In some example embodiments, the input index (bin, in the examples above) uses a different range than the integer index into the array. In these embodiments, the index may be converted after the weight is calculated and before the two data values are accessed. For example, if the input index is in the range 0 to 1, the line bin_floor*=sConsts1→dataElements−1;

may be added, converting bin_floor to the range of the number of data elements. As another example, if the input index is in the range −size/2 to size/2, the line bin_floor+=sConsts1→dataElements>>2;

may be added, shifting bin_floor up by half of the number of data elements in the interpolated array, resulting in the range being from 0 to size. Other transformations of the input index are also contemplated.

Figure 10:
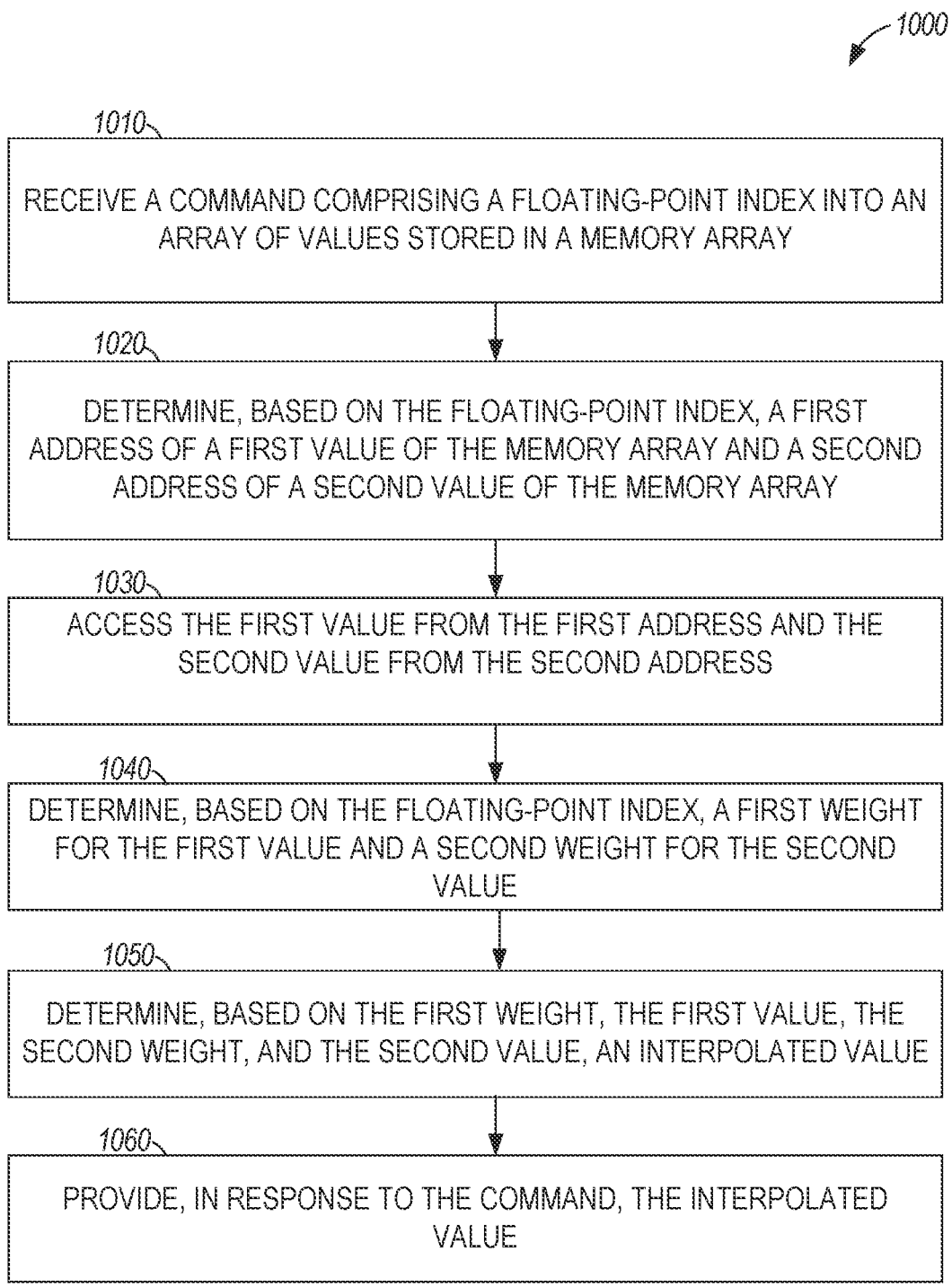
FIG. 10 is a flow chart showing operations of a method performed by a circuit in performing interpolation, in accordance with some embodiments of the present disclosure.

FIG. 10 is a flow chart showing operations of a method 1000 performed by a circuit in performing interpolation, in accordance with some embodiments of the present disclosure. The method 1000 includes operations 1010, 1020, 1030, 1040, 1050, and 1060. By way of example and not limitation, the operations 1010-1060 are performed by the memory controller 130 of FIGS. 1 and 9 performing the pseudo code of the linearInterpolateFloat function.

In operation 1010, the memory controller 130 receives a command (e.g., from the host processor 122) comprising a floating-point index into an array of values stored in a memory array. The memory controller 130 determines, based on the floating-point index, a first address of a first value of the memory array and a second address of a second value of the memory array (operation 1020). In the linearInterpolateFloat function, the first address is the address of dataP0[bin_floor] and the second address is the address of dataP0[bin_floor+1].

The memory controller 130, in operation 1030, accesses the first value from the first address and the second value from the second address. Also, in operation 1040, the memory controller determines, based on the floating-point index, a first weight for the first value and a second weight for the second value. In the linearInterpolateFloat function, the first weight is (1.0f−w) and the second weight is w.

In operation 1050, the memory controller 130 determines an interpolated value (e.g., the value of sample in linearInterpolateFloat), based on the first weight, the first value, the second weight, and the second value. The memory controller 130 provides, in response to the command received in operation 1010, the interpolated value.

By using the method 1000, interpolation is performed within the memory controller 130 instead of by the host processor 122. The method 1000 may be performed simultaneously by multiple memory controllers 130 operating on multiple memories 128. Each of the memories 128 may store a separate portion of a data set to be operated on. One use of linear interpolation is in processing SAR data to generate images suitable for using as input to an algorithm (e.g., a trained machine-learning model) for autonomous navigation of an autonomous vehicle (e.g., a flying drone (also referred to as an unmanned aerial vehicle (UAV) or autonomous land vehicle (e.g., a car, lank, or tractor-trailer rig)). For example, SAR pulse data may be divided into physical regions and all pulses for a single region stored on one memory 128. In various example embodiments, the division of data into the memories 128 is at a larger or smaller granularity.

Since performing interpolation by the host processor 122 comprises (at least) requesting the two data values to be interpolated between, use of the method 1000 reduces the data transmitted from the memory controller 130 to the host processor 122 by at least a factor of two. Power consumed by the data transmission is reduced by a similar factor, increasing the battery life of battery-powered devices, such as drones. Thus, the CNM system 102 may be integrated into an autonomous vehicle, whereby using the method 1000 to perform linear interpolation serves to increase the battery life of the vehicle, increase the range of the vehicle, allow a smaller and lighter battery to be used, or any suitable combination thereof.

Figure 11:
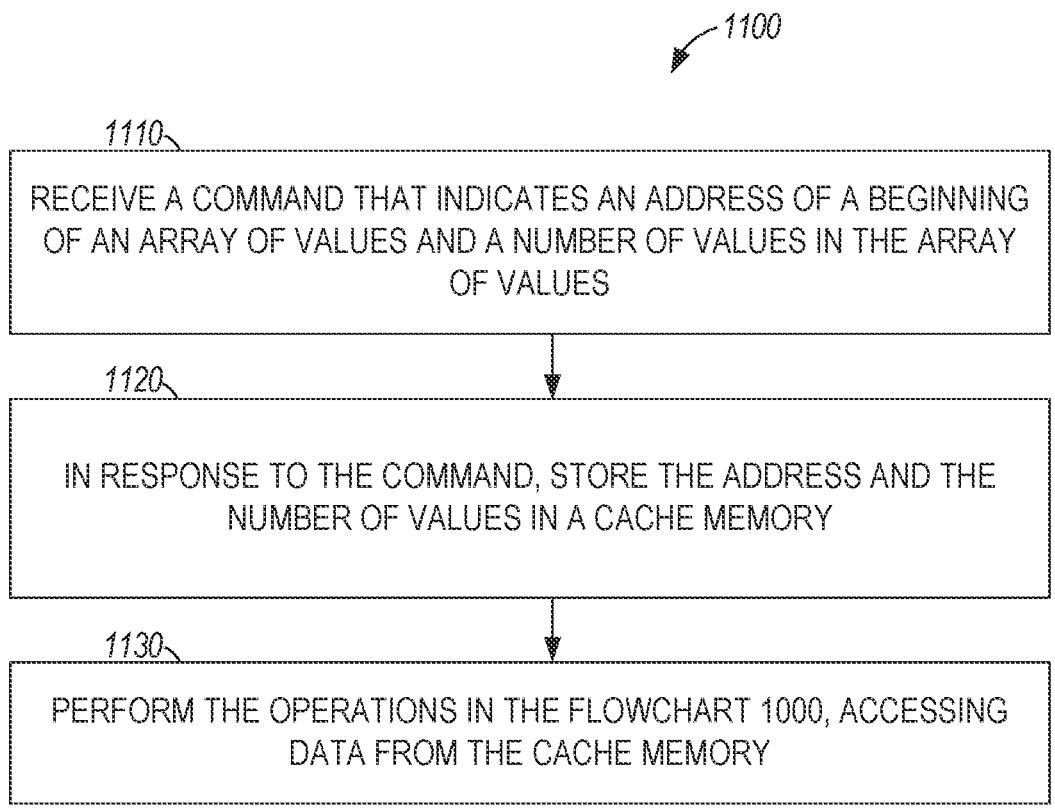
FIG. 11 is a flow chart showing operations of a method performed by a circuit in performing interpolation, in accordance with some embodiments of the present disclosure.

FIG. 11 is a flow chart showing operations of a method 1100 performed by a circuit in performing interpolation, in accordance with some embodiments of the present disclosure. The method 1100 includes operations 1110, 1120, and 1130. By way of example and not limitation, the operations 1110-1130 are performed by the memory controller 130 of FIGS. 1 and 9.

In operation 1110, the memory controller 130 receives a command that indicates an address of a beginning of an array of values and a number of values in the array of values. For example, the numElements and dataP0 pointer used in the linearInterpolateFloat function may be received. Alternatively, a pointer to a data structure may be included in the command, such that the address of the beginning of the array of values and the number of values in the array are derived from the data structure. An example of this is shown in the linearInterpolate2D function, in which numElements is derived from the sConsts1 pointer and dataP0 is derived from the sConsts2 pointer and the pIdx parameter.

In response to the command, in operation 1120, the memory controller stores the address and the number of values in a cache memory (e.g., the cache 212 of FIG. 2). In operation 1130, the memory controller performs the method 1000, accessing the values stored in the cache memory.

Dividing the provision of the parameters for the linear interpolation function between an initialization command and an interpolation request reduces the communication overhead for repeated interpolation requests within the same array of values. The initialization command is only repeated if the array of values changes. Thus, by comparison with methods that provide all parameters for each interpolation request, communication between the processor and the memory controller is reduced, latency is reduced, throughput is increased, and power consumption is reduced.

Figure 12:
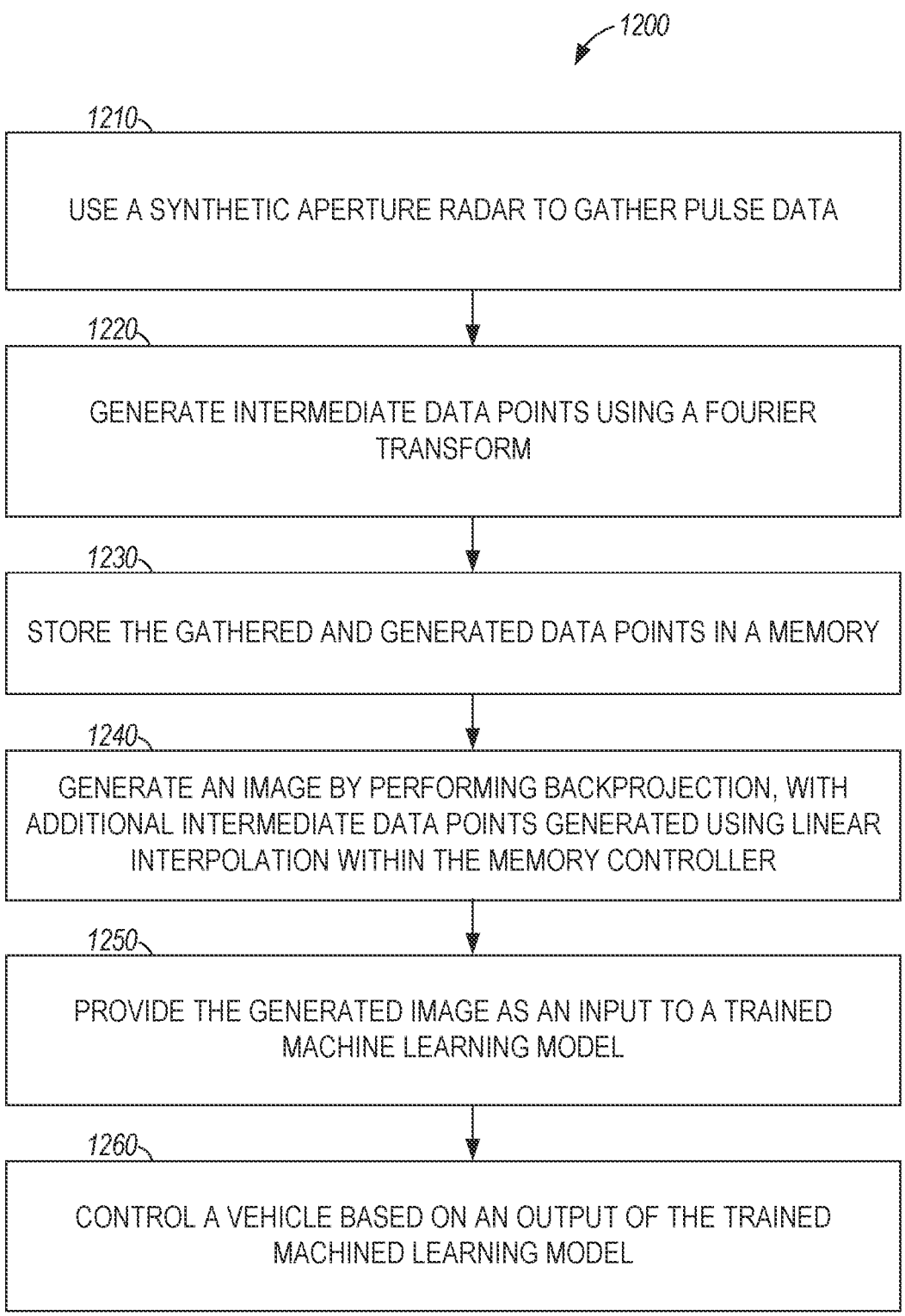
FIG. 12 is a flow chart showing operations of a method performed by a circuit in controlling a vehicle, in accordance with some embodiments of the present disclosure.

FIG. 12 is a flow chart showing operations of a method performed by a circuit in controlling a vehicle, in accordance with some embodiments of the present disclosure. By way of example and not limitation, the method 1200 may be performed by an autonomous vehicle comprising the memory systems of one or more of FIGS. 1-9. The method 1200 includes operations 1210, 1220, 1230, 1240, 1250, and 1260.

In operation 1210, the vehicle uses a SAR to gather pulse data. For example, a flying drone may carry an antenna subsystem disposed below the body of the drone. The antenna subsystem generates radar pulses and receives radar reflections (pulse data).

The vehicle generates, in operation 1220, intermediate data points using a Fourier transform. Each pulse generates a discrete data point. To increase the resolution of an image generated through backprojection, additional intermediate data points are used. FFT generates intermediate data points of suitable accuracy for this purpose. The HTP 140 of the CNM system 102, in some example embodiments, performs operation 1220. As another example HTP chiplets 718 and 720 of the CNM package 700 of FIG. 7 (optionally organized as the tiled chiplet example 800 of FIG. 8) perform operation 1220. Generation of the intermediate data points may be performed in parallel for each sequence of pulse data or for different portions of a single sequence of pulse data.

In operation 1230, the gathered and generated data points are stored in a memory. For example, the data may be stored in the memory device 128 of FIGS. 1 and 9, memory modules 712a and 712b of FIG. 7, memory devices of chiplets in the chiplet cluster 802 of FIG. 8, or any suitable combination thereof. Using FFT interpolation instead of using more radar pulses allows for a simpler radar antenna to be used, reduces the energy expended in generating pulses and detecting reflections, or both.

In operation 1240, the vehicle generates an image by performing backprojection, with additional intermediate data points generated using linear interpolation within the memory controller. For example, the method 1100 may be performed repeatedly as the stored pulse data is iterated over in performing the backprojection algorithm. Using linear interpolation instead of a higher resolution FFT to generate the additional intermediate data points saves computation and memory storage, which saves energy and weight (as a result of not needing a larger memory device). Performing the linear interpolation within the memory controller instead of in a different processing element saves energy and memory bandwidth.

As with the generation of the interpolated data using the FFT in operation 1220, operation 1240 may be substantially parallelized by the use of multiple HTPs 140 of the CNM system 102, HTP chiplets 718 and 720 of the CNM package 700 of FIG. 7 (optionally organized as the tiled chiplet example 800 of FIG. 8), or any suitable combination thereof.

The vehicle provides the generated image as an input to a trained machine learning model or other control algorithm (operation 1250). For example, a machine learning model may be trained on a training set of labeled images to learn how to control a vehicle. The resulting model is loaded into the vehicle (e.g., into memories of the tiled chiplet example 800 for evaluation by processing elements of the tiled chiplet example 800) and used to generate control signals for the vehicle. For example, the model may be trained to avoid obstacles while maintaining a heading for a pre-programmed destination. Thus, upon detecting an obstacle ahead, the model generates a signal to steer left, right, up, or down to avoid the obstacle even though the path length to the destination is increased. Accordingly, periodically providing images generated through SAR to the trained machine learning module allows dynamic control of the autonomous vehicle.

The vehicle is controlled based on the output of the trained machine learning model in operation 1260. For example, the output of the trained machine learning model may be connected to control signals for the autonomous vehicle, steering the vehicle left or right, increasing or decreasing speed, or (for a UAV) adjusting altitude, direction, yaw, pitch, or roll.

Figure 13:
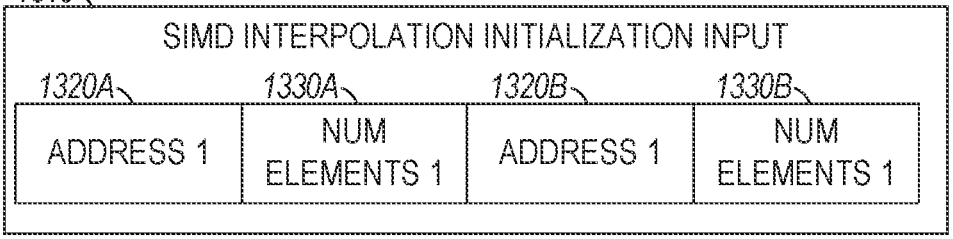
FIG. 13 is a block diagram showing a single-instruction/multiple-data (SIMD) input and a SIMD output for commands causing interpolation to be performed within a memory system, in accordance with some embodiments of the present disclosure.
Figure 13:
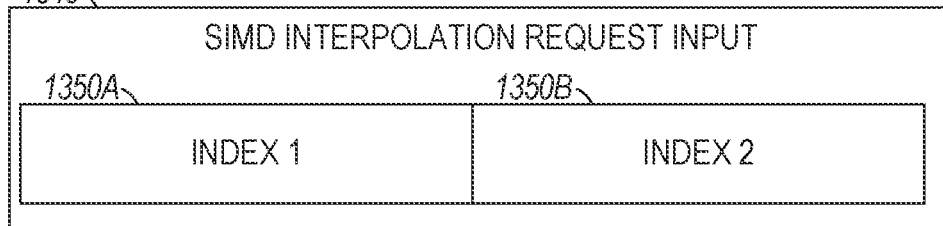
Figure 13:
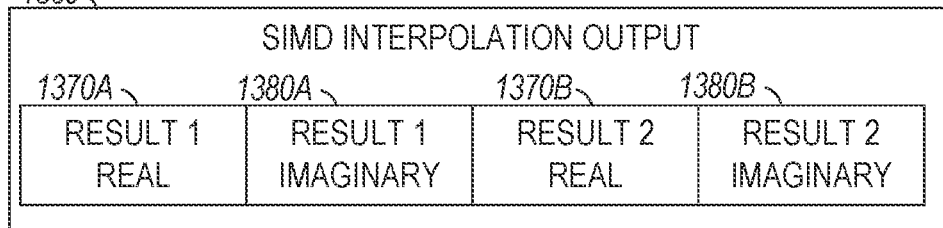

FIG. 13 is a block diagram showing a SIMD interpolation initialization input 1310, a SIMD interpolation request input 1340, and a SIMD interpolation output 1360 for commands causing interpolation to be performed within a memory system, in accordance with some embodiments of the present disclosure. Each SIMD command comprises multiple data inputs and a single control input. The processing element receiving the SIMD command performs, for each data input, the same command. By comparison with single-input single-data commands, the overhead of command signals is reduced. SIMD commands are useful in machine learning and image processing applications, among other uses.

The SIMD interpolation initialization input 1310 comprises two or more addresses 1320A-1320B and an equal number of element counts 1330A-1330B (e.g., for SIMD processing of operations 1110 and 1120 of FIG. 11).

Each pair of inputs provides the initialization data for following SIMD interpolation requests. In some example embodiments, eight pairs of inputs are included in the SIMD interpolation initialization input 1310. As an alternative to the provision of both the address and the number of elements in a single SIMD command, the initialization parameters may be divided among multiple SIMD commands. For example, a first SIMD command may be received that comprises a 64-bit address for each of the multiple data channels and a second SIMD command may be received that comprises a 64-bit integer for each of the multiple data channels.

The SIMD interpolation request input 1340 comprises two or more floating-point indices 1350A and 1350B, suitable for use in operation 1010 of FIG. 10. The index 1350A is used as an offset from the address 1320A and the index 1350B is used as an offset from the address 1320B. In some example embodiments, eight indices are included in the SIMD interpolation request input 1340.

The SIMD interpolation output 1360 comprises two or more interpolated result values. In the example of FIG. 13, the interpolated result values are complex values. Thus, the SIMD interpolation output 1360 includes a first real portion 1370A, a first imaginary portion 1380A, a second real portion 1370B, and a second imaginary portion 1380B. The first complex output is generated using the first input, the second complex output is generated using the second input, and so on if more inputs are provided.

In some example embodiments, and as shown in FIG. 2, the size of each output value is the same as the size of each input value. For example, 64-bit double-precision floating point numbers may be received as the indices 1350A and 1350B and each of the result portions 1370A-1380B may be a 32-bit single-precision floating point number, such that each complex result is a 64-bit value. As another example, 64-bit double-precision floating point numbers may be received as the indices 1350A-1350B and the results may be 64-bit double-precision real (not complex) floating point numbers.

Matching the size of the input and output values may maximize the efficiency of the use of the memory interface to the memory controller. If the output size is larger than the input size, the input is either loosely packed (e.g., a 128-bit interface that carries only 64 input bits to accommodate a doubling in the size on output) or multiple data transfers are used to receive the output (e.g., two 128-bit transfers are used to receive the 256 bits generated from a 128-bit input). If the output size is smaller than the input size, the output is loosely packed. This may be harmless, but a reduction in output size that does not reduce the number of memory transfers is not likely to be beneficial.

Since complex numbers (or other two-dimensional results) include two values, the size of the input and the output can be matched by using a precision for each component of the result that is half the precision of the input index. In this example, a 64-bit input is used and two 32-bit outputs are generated. Other possibilities include a 16-bit input and two 8-bit outputs, a 32-bit input and two 16-bit outputs, a 128-bit input and two 64-bit outputs, and so on.

The SIMD commands may be pipelined such that at least one data value begins processing on each clock cycle. Alternatively, multiple data values may begin processing in parallel.

Figure 14:
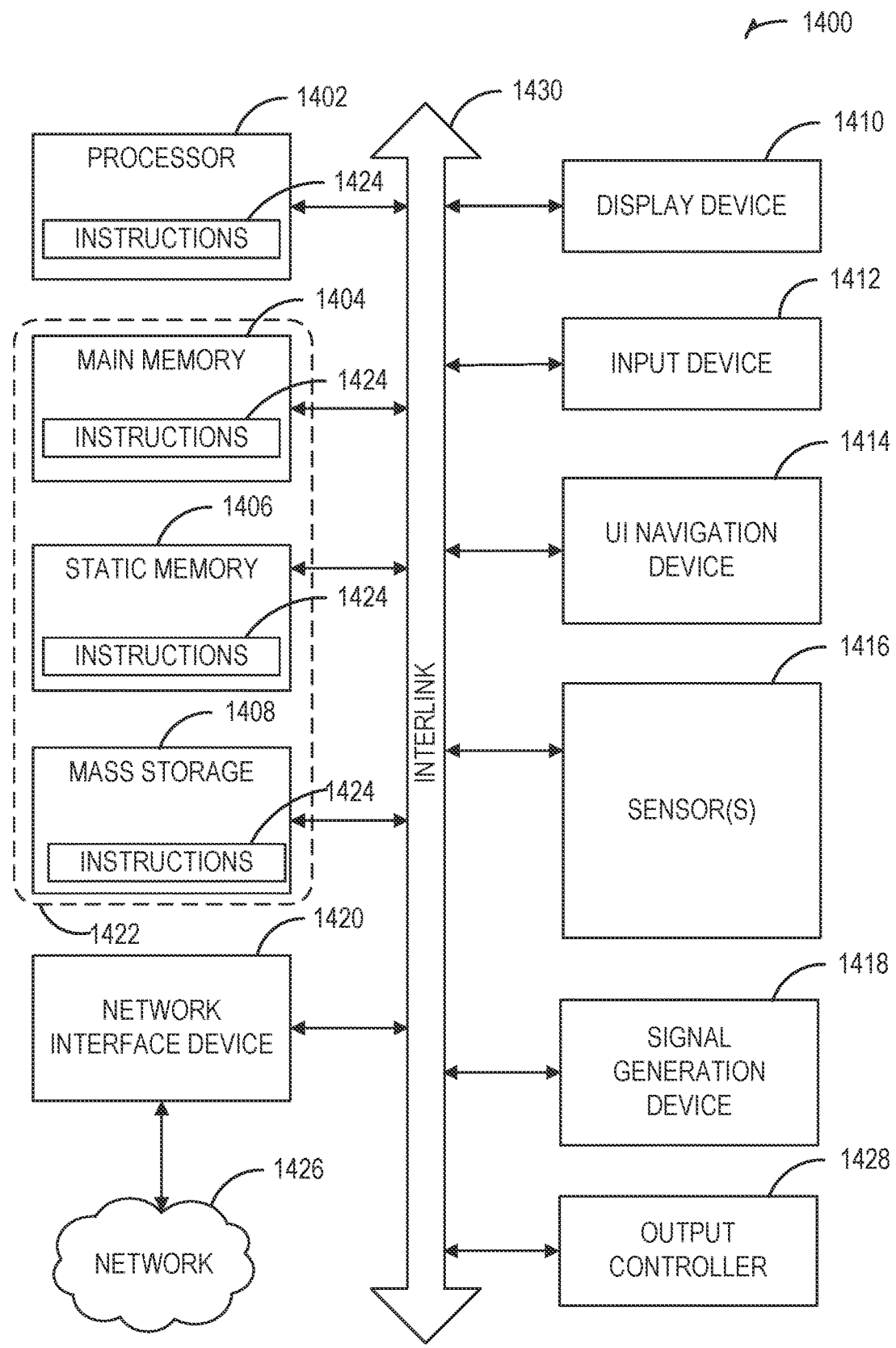
FIG. 14 illustrates a block diagram of an example machine with which, in which, or by which any one or more of the techniques (e.g., methodologies) discussed herein can be implemented.

FIG. 14 illustrates a block diagram of an example machine 1400 with which, in which, or by which any one or more of the techniques (e.g., methodologies) discussed herein can be implemented. Examples, as described herein, can include, or can operate by, logic or a number of components, or mechanisms in the machine 1400. Circuitry (e.g., processing circuitry) is a collection of circuits implemented in tangible entities of the machine 1400 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 1400.

In alternative embodiments, the machine 1400 can operate as a standalone device or can be connected (e.g., networked) to other machines. In a networked deployment, the machine 1400 can operate in the capacity of a server machine, a client machine, or both in server-client network environments. In an example, the machine 1400 can act as a peer machine in peer-to-peer (P2P) (or other distributed) network environment. The machine 1400 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine 1400 (e.g., computer system) can include a hardware processor 1402 (e.g., a central processing unit (CPU), a graphics processing unit (GPU), a hardware processor core, or any combination thereof), a main memory 1404, a static memory 1406 (e.g., memory or storage for firmware, microcode, a basic-input-output (BIOS), unified extensible firmware interface (UEFI), etc.), and mass storage device 1408 (e.g., hard drives, tape drives, flash storage, or other block devices) some or all of which can communicate with each other via an interlink 1430 (e.g., bus). The machine 1400 can further include a display device 1410, an alphanumeric input device 1412 (e.g., a keyboard), and a user interface (UI) Navigation device 1414 (e.g., a mouse). In an example, the display device 1410, the input device 1412, and the UI navigation device 1414 can be a touch screen display. The machine 1400 can additionally include a signal generation device 1418 (e.g., a speaker), a network interface device 1420, and one or more sensor(s) 1416, such as a global positioning system (GPS) sensor, compass, accelerometer, or other sensor. The machine 1400 can include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the hardware processor 1402, the main memory 1404, the static memory 1406, or the mass storage device 1408 can be, or include, a machine-readable media 1422 on which is stored one or more sets of data structures or instructions 1424 (e.g., software) embodying or used by any one or more of the techniques or functions described herein. The instructions 1424 can also reside, completely or at least partially, within any of registers of the hardware processor 1402, the main memory 1404, the static memory 1406, or the mass storage device 1408 during execution thereof by the machine 1400. In an example, one or any combination of the hardware processor 1402, the main memory 1404, the static memory 1406, or the mass storage device 1408 can constitute the machine-readable media 1422. While the machine-readable media 1422 is illustrated as a single medium, the term "machine-readable medium" can include a single medium or multiple media (e.g., a centralized or distributed database, or associated caches and servers) configured to store the one or more instructions 1424.

The term "machine readable medium" can include any medium that is capable of storing, encoding, or carrying instructions for execution by the machine 1400 and that cause the machine 1400 to perform any one or more of the techniques of the present disclosure, or that is capable of storing, encoding, or carrying data structures used by or associated with such instructions. Non-limiting machine-readable medium examples can include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., electrically programmable read-only memory (EPROM), electrically erasable programmable read-only memory (EEPROM)) and flash memory devices; magnetic disks, such as internal hard disks and removable disks; magneto-optical disks; and CD-ROM and DVD-ROM disks.

In an example, information stored or otherwise provided on the machine-readable media 1422 can be representative of the instructions 1424, such as instructions 1424 themselves or a format from which the instructions 1424 can be derived. This format from which the instructions 1424 can be derived can include source code, encoded instructions (e.g., in compressed or encrypted form), packaged instructions (e.g., split into multiple packages), or the like. The information representative of the instructions 1424 in the machine-readable media 1422 can be processed by processing circuitry into the instructions to implement any of the operations discussed herein. For example, deriving the instructions 1424 from the information (e.g., processing by the processing circuitry) can include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1424.

In an example, the derivation of the instructions 1424 can include assembly, compilation, or interpretation of the information (e.g., by the processing circuitry) to create the instructions 1424 from some intermediate or preprocessed format provided by the machine-readable media 1422. The information, when provided in multiple parts, can be combined, unpacked, and modified to create the instructions 1424. For example, the information can be in multiple compressed source code packages (or object code, or binary executable code, etc.) on one or several remote servers. The source code packages can be encrypted when in transit over a network and decrypted, uncompressed, assembled (e.g., linked) if necessary, compiled or interpreted (e.g., into a library, stand-alone executable etc.) at a local machine, and executed by the local machine.

The instructions 1424 can be further transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), plain old telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1420 can include one or more physical jacks (e.g., Ethernet, coaxial, or phone jacks) or one or more antennas to connect to the network 1426. In an example, the network interface device 1420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software. A transmission medium is a machine readable medium.

To better illustrate the methods and apparatuses described herein, a non-limiting set of Example embodiments are set forth below as numerically identified Examples.

Example 1 is a system comprising: a memory array; and a memory controller coupled to the memory array and configured to perform operations comprising: receiving, via a bus, a command comprising a floating-point index into an array of values stored in the memory array; determining, based on the floating-point index, a first address of a first value of the array of values and a second address of a second value of the array of values; accessing, from the memory array, the first value from the first address and the second value from the second address; determining, based on the floating-point index, a first weight for the first value and a second weight for the second value; determining, based on the first weight, the first value, the second weight, and the second value, an interpolated value; and providing, in response to the command, the interpolated value.

In Example 2, the subject matter of Example 1 includes, circuits to control a vehicle; and one or more processing elements configured to perform operations comprising: using the interpolated value to generate an image from synthetic aperture radar (SAR) pulse data; providing the image to a trained machine learning model; and using a result from the trained machine learning model to generate inputs to the circuits to control the vehicle.

In Example 3, the subject matter of Example 2 includes, wherein: the one or more processing elements are further configured to cause interpolated values for generation of the image to be determined by multiple memory controllers connected in a hybrid threading fabric.

In Example 4, the subject matter of Examples 1-3 includes, wherein: the bus is part of a network on chip (NOC); and the command is received from a host processor.

In Example 5, the subject matter of Examples 1-4 includes, wherein the providing of the interpolated value comprises providing the interpolated value via a network on chip (NOC) hub edge to a hybrid threading processor (HTP).

In Example 6, the subject matter of Examples 1-5 includes, wherein the memory controller is a memory controller chiplet of a computer near memory (CNM) system.

In Example 7, the subject matter of Examples 1-6 includes, wherein: the system further comprises a cache memory; and the operations further comprise: receiving, prior to the receiving of the command, a second command that indicates an address of a beginning of the array of values and a number of values in the array of values; and in response to the second command, storing the address and the number of values in the cache memory.

In Example 8, the subject matter of Examples 1-7 includes, wherein: the received command is a single instruction/multiple data (SIMD) command that comprises multiple floating-point indices into multiple arrays of values stored in the memory array, the multiple floating-point indices comprising the floating-point index.

In Example 9, the subject matter of Example 8 includes, wherein: the SIMD command is pipelined such that at least one of the multiple floating-point indices is processed each clock cycle.

In Example 10, the subject matter of Examples 1-9 includes, wherein: the floating-point index has a value between a first integer index of the array of values and a second integer index of the array of values; and the first address corresponds to the first integer index and the second address corresponds to the second integer index.

In Example 11, the subject matter of Example 10 includes, wherein the operations further comprise: performing bounds-checking on the floating-point index.

In Example 12, the subject matter of Examples 1-11 includes, wherein: the floating-point index is a real number stored using a first number of bits; and the provided interpolated value is a complex number comprising a real portion stored using a second number of bits and an imaginary portion stored using the second number of bits, the second number of bits being half the first number of bits.

In Example 13, the subject matter of Example 12 includes, wherein: the first number of bits is 64 bits; and the second number of bits is 32 bits.

In Example 14, the subject matter of Examples 1-13 includes, wherein the determining of the interpolated value comprises: determining a first product of the first value with the first weight; determining a second product of the second value with the second weight; and determining the interpolated value as a sum of the first product and the second product.

Example 15 is a non-transitory machine-readable medium that stores instructions that, when executed by a system, cause the system to perform operations comprising: receiving, via a bus, a command comprising a floating-point index into an array of values stored in a memory array; determining, based on the floating-point index, a first address of a first value of the array of values and a second address of a second value of the array of values; accessing, from the memory array, the first value from the first address and the second value from the second address; determining, based on the floating-point index, a first weight for the first value and a second weight for the second value; determining, based on the first weight, the first value, the second weight, and the second value, an interpolated value; and providing, in response to the command, the interpolated value.

In Example 16, the subject matter of Example 15 includes, wherein the operations are for a memory controller chiplet of a computer near memory (CNM) system.

In Example 17, the subject matter of Examples 15-16 includes, wherein the operations further comprise: generating an image from synthetic aperture radar (SAR) pulse data, using the interpolated value; providing the image to a trained machine learning model; and using a result from the trained machine learning model to generate inputs to circuits to control a vehicle.

In Example 18, the subject matter of Examples 15-17 includes, wherein the operations further comprise: receiving, prior to the receiving of the command, a second command that indicates an address of a beginning of the array of values and a number of values in the array of values; and in response to the second command, storing the address and the number of values in a cache memory.

In Example 19, the subject matter of Examples 15-18 includes, wherein: the received command is a single instruction/multiple data (SIMD) command that comprises multiple floating-point indices into multiple arrays of values stored in the memory array, the multiple floating-point indices comprising the floating-point index.

In Example 20, the subject matter of Example 19 includes, wherein: the SIMD command is pipelined such that at least one of the multiple floating-point indices is processed each clock cycle.

In Example 21, the subject matter of Examples 15-20 includes, wherein: the floating-point index has a value between a first integer index of the array of values and a second integer index of the array of values; and the first address corresponds to the first integer index and the second address corresponds to the second integer index.

In Example 22, the subject matter of Example 21 includes, wherein the operations further comprise: performing bounds-checking on the floating-point index.

In Example 23, the subject matter of Examples 15-22 includes, wherein: the floating-point index is a real number stored using a first number of bits; and the provided interpolated value is a complex number comprising a real portion stored using a second number of bits and an imaginary portion stored using the second number of bits, the second number of bits being half the first number of bits.

In Example 24, the subject matter of Example 23 includes, wherein: the first number of bits is 64 bits; and the second number of bits is 32 bits.

Example 25 is a method comprising: receiving, via a bus, a command comprising a floating-point index into an array of values stored in a memory array; determining, based on the floating-point index, a first address of a first value of the array of values and a second address of a second value of the array of values; accessing, from the memory array, the first value from the first address and the second value from the second address; determining, based on the floating-point index, a first weight for the first value and a second weight for the second value; determining, based on the first weight, the first value, the second weight, and the second value, an interpolated value; and providing, in response to the command, the interpolated value.

In Example 26, the subject matter of Example 25 includes, using, by one or more processing elements, the interpolated value to generate an image from synthetic aperture radar (SAR) pulse data; providing, by the one or more processing elements, the image to a trained machine learning model; and using, by the one or more processing elements, a result from the trained machine learning model to generate inputs to circuits to control a vehicle.

In Example 27, the subject matter of Example 26 includes, causing, by the one or more processing elements, interpolated values for generation of the image to be determined by multiple memory controllers connected in a hybrid threading fabric.

In Example 28, the subject matter of Examples 25-27 includes, wherein: the bus is part of a network on chip (NOC); and the command is received from a host processor.

In Example 29, the subject matter of Examples 25-28 includes, wherein the providing of the interpolated value comprises providing the interpolated value via a network on chip (NOC) hub edge to a hybrid threading processor (HTP).

In Example 30, the subject matter of Examples 25-29 includes, receiving, prior to the receiving of the command, a second command that indicates an address of a beginning of the array of values and a number of values in the array of values; and in response to the second command, storing the address and the number of values in a cache memory.

In Example 31, the subject matter of Examples 25-30 includes, wherein: the received command is a single instruction/multiple data (SIMD) command that comprises multiple floating-point indices into multiple arrays of values stored in the memory array, the multiple floating-point indices comprising the floating-point index.

In Example 32, the subject matter of Example 31 includes, wherein: the SIMD command is pipelined such that at least one of the multiple floating-point indices is processed each clock cycle.

In Example 33, the subject matter of Examples 25-32 includes, wherein: the floating-point index has a value between a first integer index of the array of values and a second integer index of the array of values; and the first address corresponds to the first integer index and the second address corresponds to the second integer index.

In Example 34, the subject matter of Example 33 includes, performing bounds-checking on the floating-point index.

In Example 35, the subject matter of Examples 25-34 includes, wherein: the floating-point index is a real number stored using a first number of bits; and the provided interpolated value is a complex number comprising a real portion stored using a second number of bits and an imaginary portion stored using the second number of bits, the second number of bits being half the first number of bits.

In Example 36, the subject matter of Example 35 includes, wherein: the first number of bits is 64 bits; and the second number of bits is 32 bits.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" can include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," and the like are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A system comprising:
    a memory array; and
    a memory controller coupled to the memory array and configured to perform operations comprising:
        receiving, via a bus, a command comprising a floating-point index into an integer-indexed array of values stored in the memory array, the floating-point index having a value between a first integer index of the array of values and a second integer index of the array of values;

determining, based on the floating-point index, a first address of a first value of the array of values and a second address of a second value of the array of values, the first address corresponding to the first integer index, the second address corresponding to the second integer index;

accessing, from the memory array, the first value from the first address and the second value from the second address;

determining, based on the floating-point index, a first weight for the first value and a second weight for the second value;

determining, based on the first weight, the first value, the second weight, and the second value, an interpolated value; and providing, in response to the command, the interpolated value.

2. The system of claim 1, further comprising:
circuits to control a vehicle; and
one or more processing elements configured to perform operations comprising:
using the interpolated value to generate an image from synthetic aperture radar (SAR) pulse data;
providing the image to a trained machine learning model; and
using a result from the trained machine learning model to generate inputs to the circuits to control the vehicle.

3. The system of claim 2, wherein:
the one or more processing elements are further configured to cause interpolated values for generation of the image to be determined by multiple memory controllers connected in a hybrid threading fabric.

4. The system of claim 1, wherein:
the bus is part of a network on chip (NOC); and
the command is received from a host processor.

5. The system of claim 1, wherein the providing of the interpolated value comprises providing the interpolated value via a network on chip (NOC) hub edge to a hybrid threading processor (HTP).

6. The system of claim 1, wherein the memory controller is a memory controller chiplet of a computer near memory (CNM) system.

7. The system of claim 1, wherein:
the system further comprises a cache memory; and
the operations further comprise:
receiving, prior to the receiving of the command, a second command that indicates an address of a beginning of the array of values and a number of values in the array of values; and
in response to the second command, storing the address and the number of values in the cache memory.

8. The system of claim 1, wherein:
the received command is a single instruction/multiple data (SIMD) command that comprises multiple floating-point indices into multiple arrays of values stored in the memory array, the multiple floating-point indices comprising the floating-point index.

9. The system of claim 8, wherein:
the SIMD command is pipelined such that at least one of the multiple floating-point indices is processed each clock cycle.

10. The system of claim 1, wherein the operations further comprise:
performing bounds-checking on the floating-point index.

11. The system of claim 1, wherein:
the floating-point index is a real number stored using a first number of bits; and
the provided interpolated value is a complex number comprising a real portion stored using a second number of bits and an imaginary portion stored using the second number of bits, the second number of bits being half the first number of bits.

12. The system of claim 11, wherein:
the first number of bits is 64 bits; and
the second number of bits is 32 bits.

13. The system of claim 1, wherein the determining of the interpolated value comprises:
determining a first product of the first value with the first weight;
determining a second product of the second value with the second weight; and
determining the interpolated value as a sum of the first product and the second product.

14. A non-transitory machine-readable medium that stores instructions that, when executed by a system, cause the system to perform operations comprising:
receiving, via a bus, a command comprising a floating-point index into an integer-indexed array of values stored in a memory array, the floating-point index having a value between a first integer index of the array of values and a second integer index of the array of values;

determining, based on the floating-point index, a first address of a first value of the array of values and a second address of a second value of the array of values, the first address corresponding to the first integer index, the second address corresponding to the second integer index;

accessing, from the memory array, the first value from the first address and the second value from the second address;

determining, based on the floating-point index, a first weight for the first value and a second weight for the second value;

determining, based on the first weight, the first value, the second weight, and the second value, an interpolated value; and providing, in response to the command, the interpolated value.

15. The non-transitory machine-readable medium of claim 14, wherein the operations are for a memory controller chiplet of a computer near memory (CNM) system.

16. The non-transitory machine-readable medium of claim 14, wherein the operations further comprise:
generating an image from synthetic aperture radar (SAR) pulse data, using the interpolated value;
providing the image to a trained machine learning model; and
using a result from the trained machine learning model to generate inputs to circuits to control a vehicle.

17. The non-transitory machine-readable medium of claim 14, wherein the operations further comprise:
receiving, prior to the receiving of the command, a second command that indicates an address of a beginning of the array of values and a number of values in the array of values; and
in response to the second command, storing the address and the number of values in a cache memory.

18. The non-transitory machine-readable medium of claim 14, wherein:
the received command is a single instruction/multiple data (SIMD) command that comprises multiple floating-point indices into multiple arrays of values stored in the memory array, the multiple floating-point indices comprising the floating-point index.

19. The non-transitory machine-readable medium of claim 18, wherein:
the SIMD command is pipelined such that at least one of the multiple floating-point indices is processed each clock cycle.

20. The non-transitory machine-readable medium of claim 14, wherein the operations further comprise:
performing bounds-checking on the floating-point index.

21. The non-transitory machine-readable medium of claim 14, wherein:
the floating-point index is a real number stored using a first number of bits; and
the provided interpolated value is a complex number comprising a real portion stored using a second number of bits and an imaginary portion stored using the second number of bits, the second number of bits being half the first number of bits.

22. The non-transitory machine-readable medium of claim 21, wherein:
the first number of bits is 64 bits; and
the second number of bits is 32 bits.

23. A method comprising:
receiving, via a bus, a command comprising a floating-point index into an integer-indexed array of values stored in a memory array, the floating-point index having a value between a first integer index of the array of values and a second integer index of the array of values;
determining, based on the floating-point index, a first address of a first value of the array of values and a second address of a second value of the array of values, the first address corresponding to the first integer index, the second address corresponding to the second integer index;
accessing, from the memory array, the first value from the first address and the second value from the second address;
determining, based on the floating-point index, a first weight for the first value and a second weight for the second value;
determining, based on the first weight, the first value, the second weight, and the second value, an interpolated value; and
providing, in response to the command, the interpolated value.

24. The method of claim 23, further comprising:
using, by one or more processing elements, the interpolated value to generate an image from synthetic aperture radar (SAR) pulse data;
providing, by the one or more processing elements, the image to a trained machine learning model; and
using, by the one or more processing elements, a result from the trained machine learning model to generate inputs to circuits to control a vehicle.

25. The method of claim 24, further comprising:
causing, by the one or more processing elements, interpolated values for generation of the image to be determined by multiple memory controllers connected in a hybrid threading fabric.

26. The method of claim 23, wherein:
the bus is part of a network on chip (NOC); and
the command is received from a host processor.

27. The method of claim 23, wherein the providing of the interpolated value comprises providing the interpolated value via a network on chip (NOC) hub edge to a hybrid threading processor (HTP).

28. The method of claim 23, further comprising:
receiving, prior to the receiving of the command, a second command that indicates an address of a beginning of the array of values and a number of values in the array of values; and
in response to the second command, storing the address and the number of values in a cache memory.

29. The method of claim 23, wherein:
the received command is a single instruction/multiple data (SIMD) command that comprises multiple floating-point indices into multiple arrays of values stored in the memory array, the multiple floating-point indices comprising the floating-point index.

30. The method of claim 29, wherein:
the SIMD command is pipelined such that at least one of the multiple floating-point indices is processed each clock cycle.

31. The method of claim 23, further comprising:
performing bounds-checking on the floating-point index.

32. The method of claim 23, wherein:
the floating-point index is a real number stored using a first number of bits; and
the provided interpolated value is a complex number comprising a real portion stored using a second number of bits and an imaginary portion stored using the second number of bits, the second number of bits being half the first number of bits.

33. The method of claim 32, wherein:
the first number of bits is 64 bits; and
the second number of bits is 32 bits.

* * * * *